US008726015B2

(12) United States Patent
Bouchard

(10) Patent No.: US 8,726,015 B2
(45) Date of Patent: May 13, 2014

(54) METHODS AND APPARATUS FOR SECURE CONTENT ROUTING

(75) Inventor: Thaddeus Bouchard, Andover, MA (US)

(73) Assignee: Omtool, Ltd., Andover, MA (US)

( * ) Notice: Subject to any disclaimer, the term of this patent is extended or adjusted under 35 U.S.C. 154(b) by 829 days.

(21) Appl. No.: 12/338,994

(22) Filed: Dec. 18, 2008

(65) Prior Publication Data

US 2009/0164781 A1 Jun. 25, 2009

Related U.S. Application Data

(63) Continuation-in-part of application No. 10/282,932, filed on Oct. 29, 2002, now abandoned, and a continuation-in-part of application No. 11/564,645, filed on Nov. 29, 2006, and a continuation-in-part of application No. 12/209,720, filed on Sep. 12, 2008.

(60) Provisional application No. 60/351,150, filed on Oct. 29, 2001, provisional application No. 61/057,112, filed on May 29, 2008, provisional application No. 61/034,942, filed on Mar. 7, 2008.

(51) Int. Cl.
*H04L 29/06* (2006.01)

(52) U.S. Cl.
USPC ........... 713/165; 713/153; 713/156; 709/217; 726/29

(58) Field of Classification Search
USPC ................. 713/153, 156; 709/217; 726/29
See application file for complete search history.

(56) References Cited

U.S. PATENT DOCUMENTS 5,287,199 A * 2/1994 Zoccolillo .................. 358/402

5,553,145 A 9/1996 Micali
(Continued)

FOREIGN PATENT DOCUMENTS

EP 1 234 253 B1 1/2007
WO WO 99/14979 3/1999
(Continued)

OTHER PUBLICATIONS

Hardcopy Electronic Document Exchange, www.omtool.com accessed via Wayback Machine Internet Archive, "estimated publication date" of May 12, 2002.

(Continued)

*Primary Examiner* — Hadi Armouche
*Assistant Examiner* — Hee Song
(74) *Attorney, Agent, or Firm* — Choate Hall & Stewart LLP; William R. Haulbrook

(57) ABSTRACT

Systems and methods are described which provide handling and secure routing of an article of content in accordance with a code or instruction set identifier embedded in or associated with the article of content. In one aspect, the invention provides a content handling system that comprises a digital data store containing a plurality of instruction sets, each defining a content handling workflow. The system further includes a content handling engine in communication with the store, wherein the content handling engine identifies a code associated with an article of content and executes workflow processing in accordance with an instruction set associated with the code. In various embodiments, an article of content comprises digitally encoded information (e.g., containing one or more of text, image, audio, video, data, and PACS data) and/or information otherwise convertible to digital format (e.g., printed matter, images, film, and audio recordings).

17 Claims, 14 Drawing Sheets

(56) References Cited

U.S. PATENT DOCUMENTS

| | | | |
|---|---|---|---|
| 5,615,269 A | 3/1997 | Micali | |
| 5,629,982 A | 5/1997 | Micali | |
| 5,666,420 A | 9/1997 | Micali | |
| 5,673,316 A | 9/1997 | Auerbach et al. | |
| 5,790,665 A | 8/1998 | Micali | |
| 5,812,670 A | 9/1998 | Micali | |
| 5,835,726 A | 11/1998 | Shwed et al. | |
| 6,011,847 A | 1/2000 | Follendore, III | |
| 6,023,345 A | 2/2000 | Bloomfield | |
| 6,134,326 A | 10/2000 | Micali | |
| 6,137,884 A | 10/2000 | Micali | |
| 6,141,750 A | 10/2000 | Micali | |
| 6,148,301 A | 11/2000 | Rosenthal | |
| 6,161,181 A | 12/2000 | Haynes, III | |
| 6,182,118 B1 | 1/2001 | Finney | |
| 6,192,165 B1 | 2/2001 | Irons | |
| 6,192,407 B1 | 2/2001 | Smith | |
| 6,427,032 B1 | 7/2002 | Irons | |
| 6,470,086 B1 | 10/2002 | Smith | |
| 6,487,599 B1 | 11/2002 | Smith | |
| 6,609,196 B1 | 8/2003 | Dickinson, III et al. | |
| 6,744,761 B1 | 6/2004 | Neumann | |
| 6,744,936 B2 | 6/2004 | Irons | |
| 6,760,752 B1 | 7/2004 | Liu et al. | |
| 6,867,876 B1 | 3/2005 | Czyszczewski | |
| 6,889,321 B1 * | 5/2005 | Kung et al. | 713/153 |
| 6,952,281 B1 | 10/2005 | Irons | |
| 6,981,023 B1 * | 12/2005 | Hamilton et al. | 709/206 |
| 7,020,843 B2 * | 3/2006 | Hamlett et al. | 715/760 |
| 7,082,538 B2 | 7/2006 | Bouchard et al. | |
| 7,168,036 B2 * | 1/2007 | Klotz et al. | 715/273 |
| 7,308,477 B1 * | 12/2007 | Gress et al. | 709/206 |
| 2001/0034739 A1 | 10/2001 | Anecki et al. | |
| 2002/0002675 A1 | 1/2002 | Bush | |
| 2002/0078052 A1 | 6/2002 | Cheng | |
| 2002/0087861 A1 | 7/2002 | Segev et al. | |
| 2002/0091928 A1 | 7/2002 | Bouchard | |
| 2002/0099938 A1 * | 7/2002 | Spitz | 713/155 |
| 2002/0138547 A1 | 9/2002 | Cherry | |
| 2003/0031341 A1 | 2/2003 | Rhoads | |
| 2003/0065623 A1 * | 4/2003 | Corneil et al. | 705/64 |
| 2003/0070074 A1 | 4/2003 | Geller et al. | |
| 2003/0099336 A1 * | 5/2003 | Speeney et al. | 379/88.19 |
| 2003/0115448 A1 | 6/2003 | Bouchard | |
| 2003/0120729 A1 | 6/2003 | Kim | |
| 2003/0163552 A1 | 8/2003 | Savitzky | |
| 2003/0217034 A1 | 11/2003 | Shutt | |
| 2004/0023656 A1 | 2/2004 | Purdy et al. | |
| 2004/0042034 A1 | 3/2004 | Tiffan | |
| 2004/0158733 A1 | 8/2004 | Bouchard | |
| 2004/0184092 A1 | 9/2004 | Ogawa | |
| 2004/0205137 A1 | 10/2004 | Chen | |
| 2004/0205616 A1 * | 10/2004 | Rosenberg et al. | 715/523 |
| 2005/0195447 A1 | 9/2005 | Os | |
| 2006/0028689 A1 * | 2/2006 | Perry et al. | 358/3.28 |
| 2007/0112854 A1 | 5/2007 | Franca | |
| 2007/0180032 A1 | 8/2007 | Pearson | |
| 2007/0192275 A1 | 8/2007 | Foygel et al. | |
| 2008/0126513 A1 | 5/2008 | Bouchard et al. | |

FOREIGN PATENT DOCUMENTS

| | | |
|---|---|---|
| WO | WO 99/34304 | 7/1999 |
| WO | WO 01/35273 A1 | 5/2001 |
| WO | WO 01/52485 | 7/2001 |
| WO | WO 03/36515 | 5/2003 |

OTHER PUBLICATIONS

International Search Report for PCT/US2002/034673, mailed May 2, 2003 (3 pages).

FlowPort User Guide; Aug. 2000; Xerox Corporation, (pp. 2-4, 3-10, 4-3, 4-6, 5-3, 5-4, 5-5, 5-18, and 5-38).

* cited by examiner

METHODS AND APPARATUS FOR SECURE CONTENT ROUTING

CROSS-REFERENCE TO RELATED U.S. APPLICATIONS

The present application is a continuation-in-part of U.S. patent application Ser. No. 10/282,932 filed on Oct. 29, 2002, which claims priority to provisional U.S. Patent Application Ser. No. 60/351,150 filed on Oct. 21, 2001, and of U.S. patent application Ser. No. 11/564,645 filed Nov. 29, 2006, and of U.S. patent application Ser. No. 12/209,720 filed Sep. 12, 2008, which claims priority to provisional U.S. Patent Application No. 61/057,112 filed May 29, 2008 and also claims priority to 61/034,942 filed Mar. 7, 2008, and is a continuation-in-part of U.S. patent application Ser. No. 11/564,645 filed Nov. 29, 2006. The foregoing applications are incorporated by reference in their entirety.

FIELD OF THE INVENTION

The inventive methods and apparatus relate to information technology and, more particularly, to content handling. The methods and apparatus have application, by way of non-limiting example, in the routing of digital content, e.g., within and among enterprises, and includes secure routing of digital content.

BACKGROUND

To date, the routing and other handling of digital content, e.g., within and among enterprises, has been largely limited to electronic document distribution. That field has traditionally been long on promise, but short on delivery. The advent of each new electronic document technology has brought the hope of easy dissemination—not only between the document's original creator and recipient, but also among subsequent recipients inside and outside an enterprise. However, the degree to which this has been achieved in practice varies widely. On one end of the spectrum is e-mail, which is built on a protocol designed for distribution and redistribution and which serves both functions well. On the other end of the spectrum are word processing and scanner technologies, both originally intended for document creation, and both which often achieve distribution only through add-on or third-party solutions.

More recent activity in the art has been directed towards leveraging peer-to-peer networking and Web 2.0 technologies to distribute digital media content (e.g., movies, music, etc.), in addition to electronic documents. For example, iTunes distributes a variety of content including music, movies, television shows, etc., sourced by record companies, movie studios and other more traditional content providers, and YouTube provides a website for users to post and/or view streaming videos. While these are examples of recent digital media distribution systems, they do not address the typical requirements a user may expect from a content management system, e.g., customization and integration with an enterprise network including capabilities for secure routing and/or secure distribution of articles of content as well as recordation of an audit trail of communications.

SUMMARY

In various embodiments, provided are inventive methods and apparatus for digital content handling which are scalable and adaptable to support a range of user and enterprise needs, including secure routing and/or distribution of digital content. In various aspects, the methods and apparatus can be utilized in connection with data processing and other technologies—such as scanners, voice dictation systems, document capture and mark-up systems (e.g., those utilizing the Adobe PDF format)—that are conventional in the marketplace.

In certain embodiments, the inventive apparatus provides a content handling system that comprises a digital data store containing a plurality of instruction sets, each defining a content handling workflow. The system further includes a content handling engine in communications coupling with the store, wherein the content handling engine identifies an embedded code in an article of content. The engine executes on at least that article of content one or more of the instruction sets associated with the embedded code.

The inventive embodiments include a content handling system providing secure content routing for an enterprise digital data processing system. The content handling system comprises a content handling engine comprising a message server in communication with a secure communication component wherein the message server receives an article of content and a code associated with the article of content. In certain embodiments, the code identifies a set of instructions for processing the article of content. The message server identifies the set of instructions from the code, and the set of instructions identifies one or more destinations, a format for each of the one or more destinations, and whether the article of content is to be transmitted securely to each of the one or more destinations. In various embodiments, the message server executes the set of instructions on the article of content to transform the article of content into the identified format and according to the identified security for each of the one or more destinations, and the content handling system distributes electronically to each of the one or more destinations a corresponding transformed article of content. In some embodiments, the message server can include information about the execution of instructions and/or distribution of the article of content in a tamper-resistant, tamper-evident, verifiable, non-repudiable audit trail.

In related aspects, the inventive apparatus provide a content handling system as described above in which an article of content comprises any of digitally encoded information (e.g., containing one or more of text, image, audio, video, data, and PACS data) and/or information otherwise convertible to digital format (e.g., printed matter, images, film, and audio recordings).

In related aspects, the inventive apparatus provide systems as described above in which the instruction set specifies any of (i) one or more destinations for articles of content (e.g., e-mail addresses, local or network file system folders, and on-line data stores), (ii) one or more formats (e.g., text, image, audio, video, data, PACS data formats) in which articles of content are to be delivered to those destinations, (iii) additional content (e.g., textual, image, audio, video, data, and PACS data content) to be delivered to those destinations, (iv) one or more conversions (e.g., optical character recognition, voice-to-text, and image resolution upgrading/downgrading) to be executed on articles of content, (v) security of transmission, and (vi) recordation of a communications audit trail.

Further aspects of the invention provide a content handling system comprising a content source and a content handling engine in communications coupling with the content source. The content handling engine identifies an embedded code in an article of content from the content source and executes on at least that article of content one or more instructions associated with (or defined in) the embedded code, distributing, storing and/or otherwise processing the article as defined by the instructions.

In still yet further related aspects, provided are systems as described above in which the embedded code is associated with a unique identification of an instruction set of the type described above.

In further related aspects, provided are systems as described above in which the embedded code is created and/or embedded in articles of content by a system external to the content handling system. Such an external system can include, by way of non-limiting example, an e-mail system, an enterprise content management system or other systems (possibly, including a combination of automated, semi-automated or manual elements) from which articles of content processed by the content handling engine are obtained. Such embedded codes can include hand-written notes, bar codes, text strings, content type codes, voice commands, audio signals, image elements, all by way of example.

In still further related aspects, provided are systems as described above in which the embedded code is translated by the content handling engine into the unique instruction set identification with which it is associated.

In still yet further related aspects, provided are systems as described above in which the aforementioned digital data store is distributed.

In still further related aspects, provided are systems as described above in which the embedded code is not contained at a predefined position in the article of content, and in which the content handling engine identifies the embedded code by at least searching the article to find the embedded code. In further related aspects, the invention provides systems as described above in which the content handling engine identifies the embedded code by any of bar code recognition, voice recognition, optical character recognition and voice-to-text conversion.

In yet further aspects, provided are systems as described above in which the content handling engine alternatively or additionally identifies the embedded code in metadata or other information fields associated with (i) an article of content, (ii) a packet, file or other container in which such article is transmitted or contained, and/or (iii) a data store, content management system or other store from which the article is sourced and/or maintained.

In related aspects, the invention provides systems as described above in which the content handling engine discerns the embedded code from a characteristic of the article itself (e.g., type of content, such as scanned document, music, image, etc.), the manner in which it is encoded and/or stored (e.g., pdf, mp4, tiff, etc.), and/or the substance of the content (e.g., specific words and/or images contained in the article of content).

In still further related aspects, the invention provides systems as described above in which the content handling engine identifies the embedded code by transforming at least a portion of the article of content from a first format to a second format and extracting the embedded code therefrom.

Still other aspects of the invention provide methods paralleling the operations described above.

As an example of a corresponding method, the inventive embodiments include a method of secure content routing for an enterprise digital data processing system. The method comprises receiving, by a content handling engine, an article of content and a code associated with the article of content. In various aspects, the code identifies a set of instructions for processing the article of content. The method further comprises identifying, by the content handling engine, the set of instructions from the code. In various embodiments, the set of instructions identifies one or more destinations, a format for each of the one or more destinations, and whether the article of content is to be transmitted securely to each of the one or more destinations. The method further comprises executing, by the content handling engine, the set of instructions on the article of content to transform the article of content into the identified format and with the identified security for each of the one or more destinations. In various embodiments, the method further includes distributing electronically to each of the one or more destinations a corresponding transformed article of content.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the present invention will become more apparent from the detailed description set forth below when taken in conjunction with the drawings.

DETAILED DESCRIPTION

Figure 1:
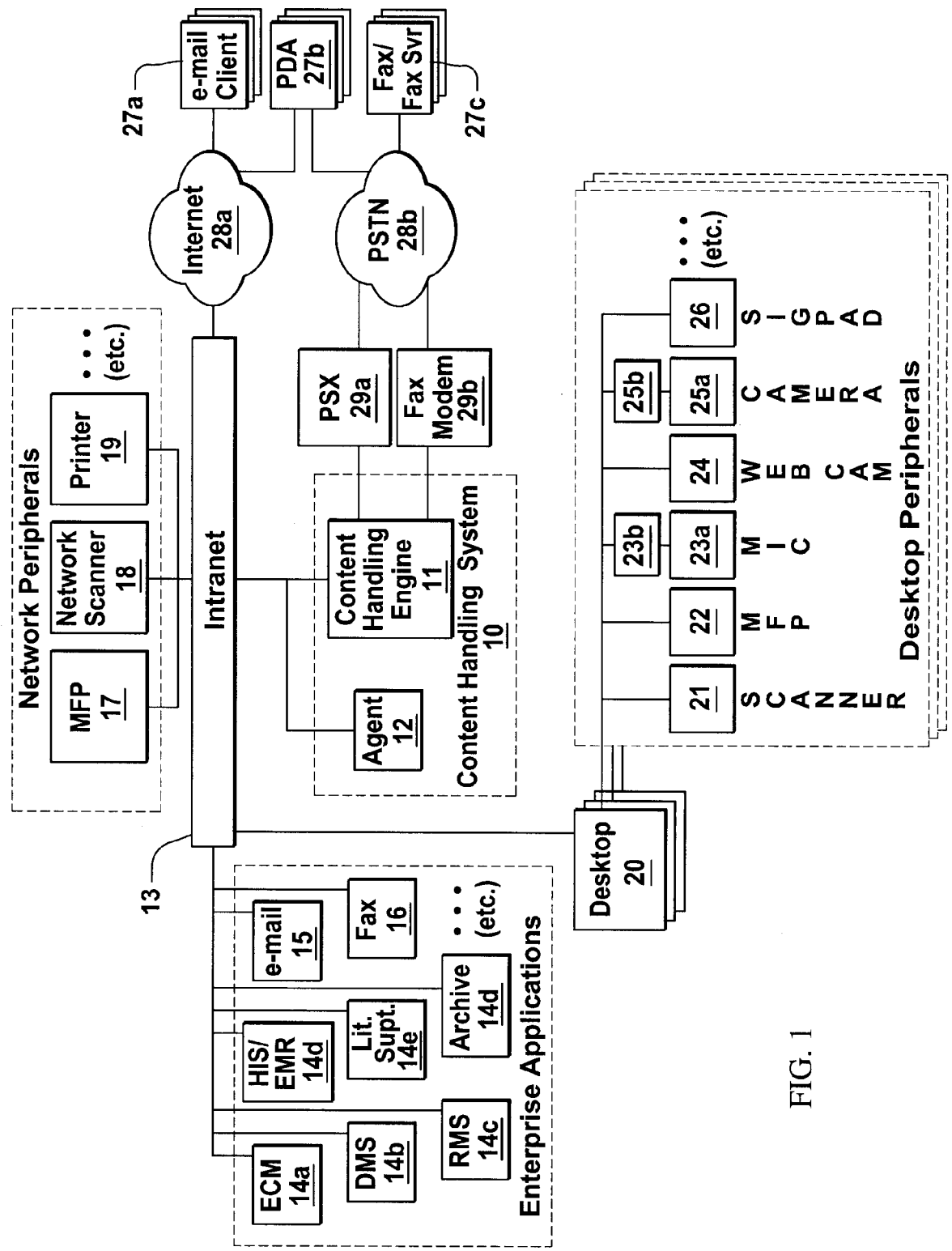
FIG. 1 depicts an enterprise digital data processing system that includes a content handling system according to the invention.

FIG. 1 depicts an enterprise digital data processing system with a content handling system according to the invention. This includes a content handling system 10 that is coupled for communication with devices and systems on an intranet 13 (e.g., enterprise applications 44, network peripherals 17-19, client computers (e.g., desktop computers, portable computers, personal digital assistants, and so forth) 20 and associated peripherals 21-26, etc.) and with systems and devices (e.g., e-mail client 27a, personal digital assistant 27b, fax/fax server 27c) on external networks (e.g., the Internet 28a and/or the public switched telephone network 28b via PBX 29a and/or fax modem 29b), as shown. In the illustrated embodiment, the content handling system 10 comprises content handling engine 11 and agent 12; the enterprise applications 44 includes one or more of a enterprise content management system 14a, document management system 14b, records management system 14c, healthcare information system/ electronic medical records system 14d, litigation support system 14e, archive system 14f, e-mail server 15, and fax/fax server 16; the network peripherals include one or more of a multifunction printer (MFP) device 17, network scanner 18, and printer 19; client computer peripherals include one or more of a and scanner 21, MFP 22, audio input device, e.g., microphone 23a, and digitalization module 23b, web camera 24, imaging device, e.g., video camera 25a, digitalization module 25b, signature pad 26, all as shown by way of non-limiting example. The illustrated configuration is just one of many in which the invention can be practiced. For example, there may be a greater or lesser number of elements than those shown here and they may be coupled for communication by peer-to-peer networks, wide area networks, the Internet, or other communications media (wired, wireless, or otherwise), or combinations thereof, of the type known in the art.

Illustrated content handling system 10 comprises a content handling engine 11 and an agent 12, as shown. Content handling engine 11 comprises a digital data processor that facilitates the workflow-based processing and distribution to and/ or from devices and/or systems 14-27, among others, of articles of digital content (e.g., PDF documents, Microsoft Word documents, e-mails, audio and WAV files, movie files, PACS images, etc.), or of content which can be converted to digital format (e.g., scannable paper, analog movies or recordings, X-rays, pictures. etc) and contained in such articles. That digital data processor may be a desktop computer, workstation, mainframe or other computing device suitable for and adapted to operation in accord with the teachings hereof.

Devices and/or systems 14-27 comprise external or "foreign" systems, i.e., systems that are external to the content handling engine 11 and that generate, store, manage or otherwise maintain content for processing by the content handling engine 11. By way of non-limiting example, a foreign system can include a client database management system (e.g., for storing audio files, movie files, PDF documents, etc.) that transmits content to a "native" system (e.g., content handling engine 11 and its associated stores (e.g., see elements 42 and 43 of FIG. 2) operating in accord with the invention) for processing and distribution. Though a select number of foreign systems are shown in the illustrated embodiment, other embodiments have lesser, greater and or other foreign systems—including, by way of non-limiting example, web sites and/or repositories on the Internet, remote networks, and the like.

Illustrated client computers 20 comprise any of a variety of digital data processing devices used to execute client applications, such as word processors, spreadsheet programs, e-mail clients, web browsers, document capture and mark-up programs (e.g., Adobe Acrobat and/or related applications), still and moving/video image editing applications, dictation, text-to-voice, and/or voice-to-text applications and any of a host of other applications available in the marketplace suitable for generating, storing, managing or otherwise maintaining digital content. In the drawing, the client computers 20 are shown as desktop computers on an Intranet 13 (e.g., implemented in a wired local area network), though they may comprise laptop computers, personal digital assistants, workstations, mainframe computers, or otherwise, that are coupled for communications by wire, wirelessly, or otherwise. Regardless, these devices are constructed and operated in the conventional manner known in the art, as adapted in accord with the teachings hereof.

Enterprise content management system 14a, document management system 14b, records management system 14c, healthcare information system/electronic medical records system 14d, litigation support system 14e, archive system 14f, e-mail server 15, fax/fax-server 16, MFP 17, network scanner 18, and printer 19 comprise conventional digital data devices and/or systems of the respective types (i.e., content repository, scanner, MFP, printer, and fax/fax-server, respectively) available in the marketplace, as adapted for operation in accord with the teachings hereof.

This is likewise true of client computer peripherals scanner 21, MFP 22, audio input device, e.g., microphone 23a, and digitalization module 23b, web camera 24, imaging device, e.g., video camera 25a, digitalization module 25b, signature pad 26. Thus, by way of non-limiting example, microphone 23a and camera 25a comprise typical analog and/or digital imaging (e.g., video, still, or otherwise) and audio recording devices conventionally known in the art. Digitalization modules 23b and 25b transform captured audio recordings and analog images, respectively, to a digital format and, thereby, facilitate their processing and distribution by the content handling engine 11. The illustrated camera 25a, for example, may comprise an analog video camera (e.g., camcorder, etc,) used to record a conference, seminar, or the like. Prior to processing/distribution by the content handling engine 11, digitalization module 25b converts the recorded video to a digital format (e.g., MPEG, AVI, etc.). In the illustrated embodiment, the digitalized video is transmitted to the content handling engine 11 via Intranet 13, although in other embodiments it may be transmitted otherwise (e.g., via the Internet 28a, PSTN 28b, point-to-point connection, etc.).

With continued reference to FIG. 1, e-mail client 27a, PDA 27b and fax/fax server 27c, too, comprise conventional digital data devices and/or systems of their respective types available in the marketplace, as adapted for operation in accord with the teachings hereof.

Agent 12 is an autonomous component that proactively identifies content to be processed by the content handling engine 11. This can include searching foreign systems (e.g., document, e-mail or video archives, Internet sites, etc.) for articles of content with native or foreign codes (discussed below), as well as foreign instruction sets (also discussed below). When these are found, the agent 12 can generate a request to content handling engine 11 to process the articles with default and/or explicit native instruction sets.

Figure 2:
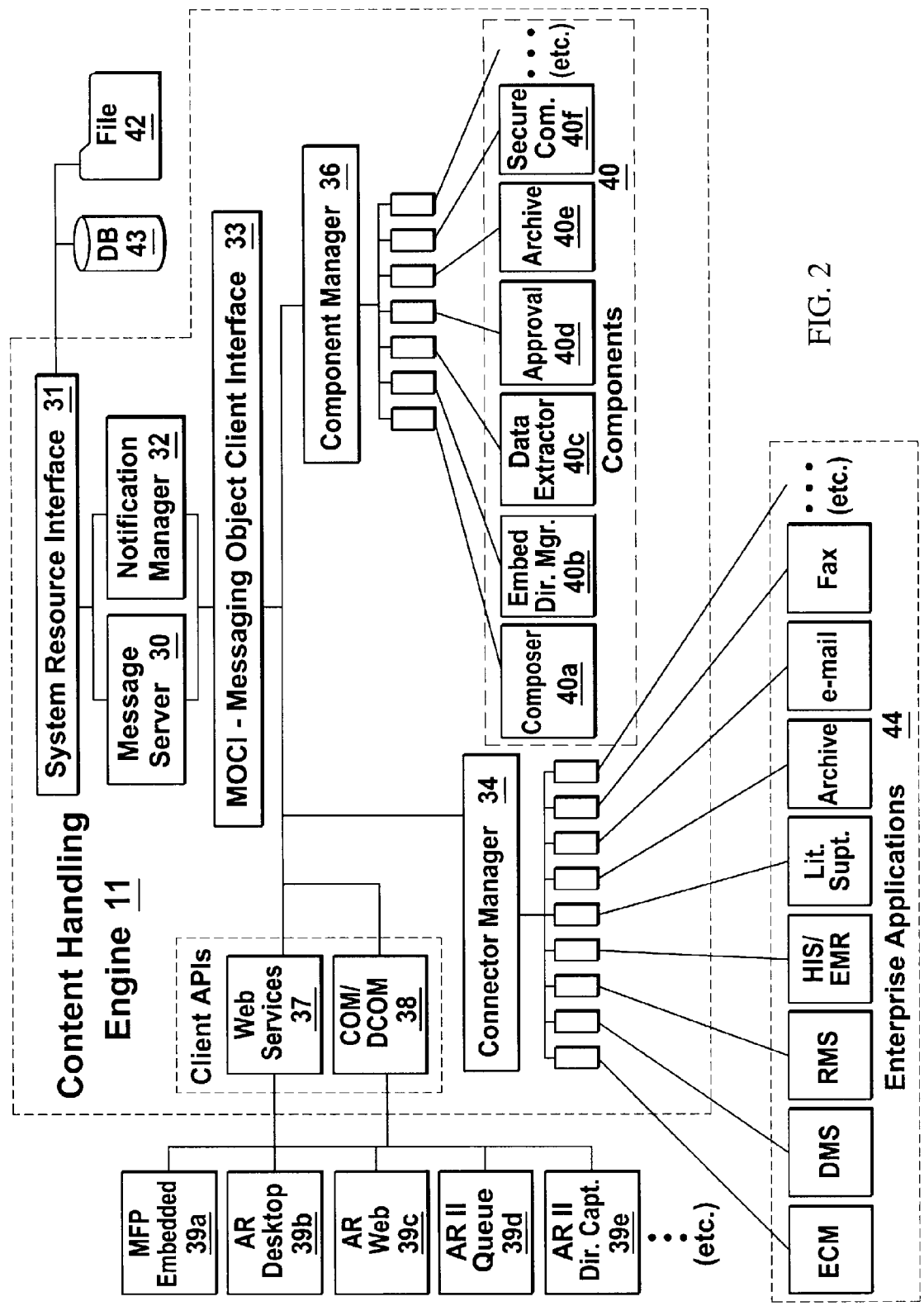
FIG. 2 depicts a content handling engine of the content handling system of FIG. 1.

FIG. 2 depicts further details of the content handling engine 11 of FIG. 1. As shown in the drawing, that content handling engine 11 comprises a message server 30, system resource interface 31, a notification manager 32, messaging object client interface (MOCI) 33, a connector manager 34, a component manager 36, and content distribution workflow processing components 40. The engine is coupled to client products 39a-39e by way of client APIs 37 and 38, and to enterprise applications 44, by way of connector manager 34, as shown, all by way of non-limiting example.

In the illustrated embodiment, elements 30-40 comprise software modules, e.g., objects, dynamic linked library (DLL) components, or otherwise, that execute on a single digital data processor or on multiple such devices. Those modules are coupled for communication as shown in the drawing and as otherwise evident herein. Such communication can be supported by the Windows® component object model (COM) and/or other mechanisms, whether or not object-oriented, known in the art, such as those used or useable in connection with object linking and embedding (OLE) technologies, ActiveX technologies, COM+technologies, distributed component object model (DCOM) technologies, Microsoft's .NET framework, and common object request broker architecture (CORBA), to name just a few.

Illustrated message server 30 executes workflows for processing and distributing articles of content. In this regard, the server 30 keeps track of process state and settings, both for the content handling engine 11 as a whole, as well as for the individual workflows via which articles of content are processed and distributed. State information, both for content handling engine 11 and for the individual workflows, are maintained in a database 43 and associated files 42 (though in other embodiments this information can be maintained in tables, linked lists, and so forth, in memory or otherwise). The database 43 can be relational, or otherwise, as known in the art, and can support SQL queries or other retrieval mechanisms, again, as known in the art.

As discussed in greater detail below, the message server 30 also facilitates creation and modification of native instruction sets that define workflows for processing articles of content. In addition, it associates such sets with the articles themselves by defining a native code that uniquely references each native instruction set and by either (i) directly embedding or associating that code within an article of content (e.g., upon request of a user or foreign system), and/or (ii) supplying the code to a user or foreign system for embedding in such an article. When the article is subsequently processed, the message server 30 executes the implicated instruction set upon identifying the embedded or associated code, e.g., by optical-character recognition, voice recognition, or otherwise. A further understanding of the message server 30 can be attained in reference to FIGS. 4A-B and the discussion below.

Illustrated system resource interface 31 comprises operating system (and attendant file system) interface routines that provide for message server 30 and notification manager 32 access and updating of the database 43 and files 42. The interface 31 may also include file and/or database applications and/or middleware of the type known in the art (as adapted in accord with the teachings hereof) that further facilitate access and/or updating of database 43 and files 42 by the server 30 and manager 32.

Illustrated notification manager 32 filters and routes events between the connector manager 34 and the component manager 36, as well as signaling the message server 30 of event occurrence. In the illustrated embodiment, event notifications are generated using a publish-and-subscribe model, though other embodiments may utilize other models for event distribution. Notifications to the component manager 36 include signaling the workflow processing components 40 that they have new jobs or tasks to complete.

Illustrated messaging object client interface (MOCI) 33 comprises operating system and/or other resources that facilitate communication between the message server 30 and notification manager 32, on the one hand, and the connector manager 34, component manager 36 and client products 39a-39e, via client APIs 37, 38, on the other hand. In this regard, the MOCI 33 can comprise any object-based messaging technology of the type known in the art (as adapted in accord with the teachings hereof), suitable for supporting such communications. In other embodiments, non-object-based messaging technologies are employed, such as RPC, and so forth, again, as adapted in accord with the teachings hereof.

Illustrated client products 39a-39e comprise document delivery and management products of the type known in the art. Preferred such products are those commercially available from the assignee hereof, as part of the Accu-Route® family of document delivery and management products. However, competitive and other products of others may be used instead or in addition.

Illustrated connector manager 34 provides a framework for execution of connectors 34a that communicate with the enterprise applications 44. To this end, it utilizes a plug-in architecture to facilitate addition, removal and/or reconfiguration of interfaces to the hardware/software 44. In other embodiments, similar functionality can be provided via an extension-based architecture, or otherwise. The interfaces, themselves, can comprise device drivers, DLLs, or otherwise, as known in the art for communication with the devices, subsystems, and so forth, that make up hardware/software 44. The connector manager can also provide a framework for execution of connector that communicate with other devices and systems of the type shown in FIG. 1, e.g., client computers 20 and client applications 21-26, PBX 29a, and fax modem 29b, all by way of non-limiting example.

Component manager 36 controls which workflow processing components 40 are called during the processing sequence of a workflow. In the illustrated embodiment, each state of the workflow is executed by one (or more) of the components 40. In this regard, the component manager 36, like the connector manager 34, supports a plug-in architecture to facilitate addition, removal and/or reconfiguration of such components 40 -though, in other embodiments, similar functionality can be provided via an extension-based architecture, or otherwise. The components 40 of the illustrated embodiment are COM components and include a composer component 40a, embedded directive manager component 40b, a data extractor component 40c, an approval component 40d and a archive component 40e. Other embodiments may use components 40 providing other functionality instead or in addition.

In some embodiments, the workflow processing components 40 include a secure communication component 40f, e.g. a secure routing module or the like adapted for operation in accord with the teachings hereof, which provides for encryption of the article of content. In some aspects, the secure routing module encrypts an article of content so that only a particular receiver of the encrypted article of content can decrypt the encrypted article. Further details of secure routing and encryption are provided below.

The composer component 40a of the illustrated embodiment is responsible for reformatting articles of content that are being processed during a workflow. To this end, the component 40a includes translation modules of the type known in the art (as adapted in accord with the teachings hereof) that can be used individually or in combination to effect required transformations. By way of further example, the composer component 40a can provide for optical character recognition (i.e., image-to-text), voice-to-text conversion, and image resolution upgrading/downgrading, just to name a few. For example, it can convert a 720×480 resolution AVI file to an MPEG file having a 640×480 resolution, e.g., for delivery to a particular data store or other specified destination.

The embedded directive manager component 40b of the illustrated embodiment is responsible for encoding and interpreting routing directives associated with articles of content. To this end, the component 40b transforms the underlying rules defining the routing directives into native codes which can be embedded into articles of content (e.g., prior to processing during a workflow). Conversely, it can additionally perform reverse transformations on encoded routing directives to produce rules which can be processed by the system (e.g., message server 30 during processing during a workflow). The component 40b may also manage the location or placement of such codes in the articles of content.

The data extractor component 40c of the illustrated embodiment is responsible for parsing meta-data and other non-content portions of articles of content being processed to facilitate identifying native codes and instruction sets. By way of non-limiting example, it identifies codes stored in meta-data and "body" fields of a PDF document, headers and messages in an e-mail document, etc. To this end, the component 40c may operate in conjunction with the embedded directive manager 40b to identify possible extraction locations within articles of content.

The approval component 40d of the illustrated embodiment is responsible for ensuring that all approval processing required in the workflow processing of an article of content are achieved, prior to advancing the article to a next state or step in the sequence. For example, a workflow may require a user signature on a PDF document, prior to printing the document, sending it to specified recipients, or performing other additional processing. Working with the data extractor 40c, the approval component 40d insures that a signature field in the PDF is completed before advancing the document for such processing.

The archive component 40e of the illustrated embodiment is responsible for storing codes, instruction sets, and in some embodiments, articles of content for archival purposes. To this end, component 40e takes "snapshots" of the database 43, e.g., at predetermined intervals or otherwise. The component 40e may also store all or specified articles of content, e.g., for specified time intervals, e.g., to prevent loss in the case of downstream equipment failures.

Illustrated client APIs 37 and 38 comprise web services and COM/DCOM modules provide an interface between the content handling engine 11, or more particularly, the message server 30, and the client-side products 39. For example, the API may provide a web-interface for a client transmitting an article of content from an AccuRoute system to the content handling engine 11 for processing and distribution.

The folder 42 of the illustrated embodiment serves as a temporary storage for articles content being processed by the content handling engine 11. Thus, for example, the message server 30 may search an article of content for an embedded code, as discussed further below, which article of content is temporarily stored in folder 42, e.g., for faster searching, etc., Illustrated temporary storage 42 can be implemented in memory (e.g., cache, RAM, etc.), or otherwise, as pointers, linked lists, and so forth.

The data store 43 (e.g., database or other repository) of the illustrated embodiment contains a record (or "queue") of all content handling requests and processing status information for workflows executed by the message server 30. As discussed above, it may store process and state settings, both for the content handling engine 11, as well as for individual workflows via which articles of content are processed and distributed. Although in the illustrated embodiment store 43 comprises a database (e.g., relational, or otherwise, as known in the art, and can support SQL queries or other retrieval mechanisms, again, as known in the art), although in other embodiments the store may maintain the information in tables, linked lists, and so forth, in memory or otherwise.

Figure 3A:
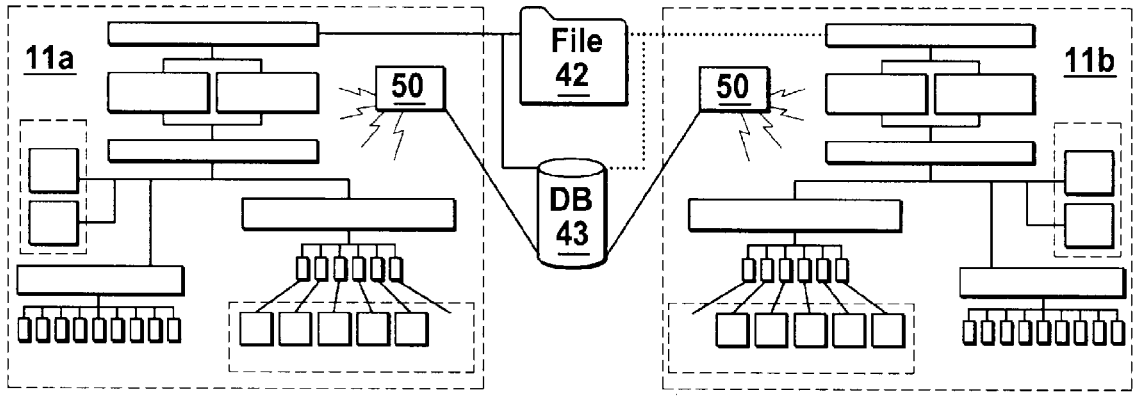
FIGS. 3A-3B depict embodiments of the invention utilizing a cluster manager for high availability of content handling functionality.
Figure 3B:
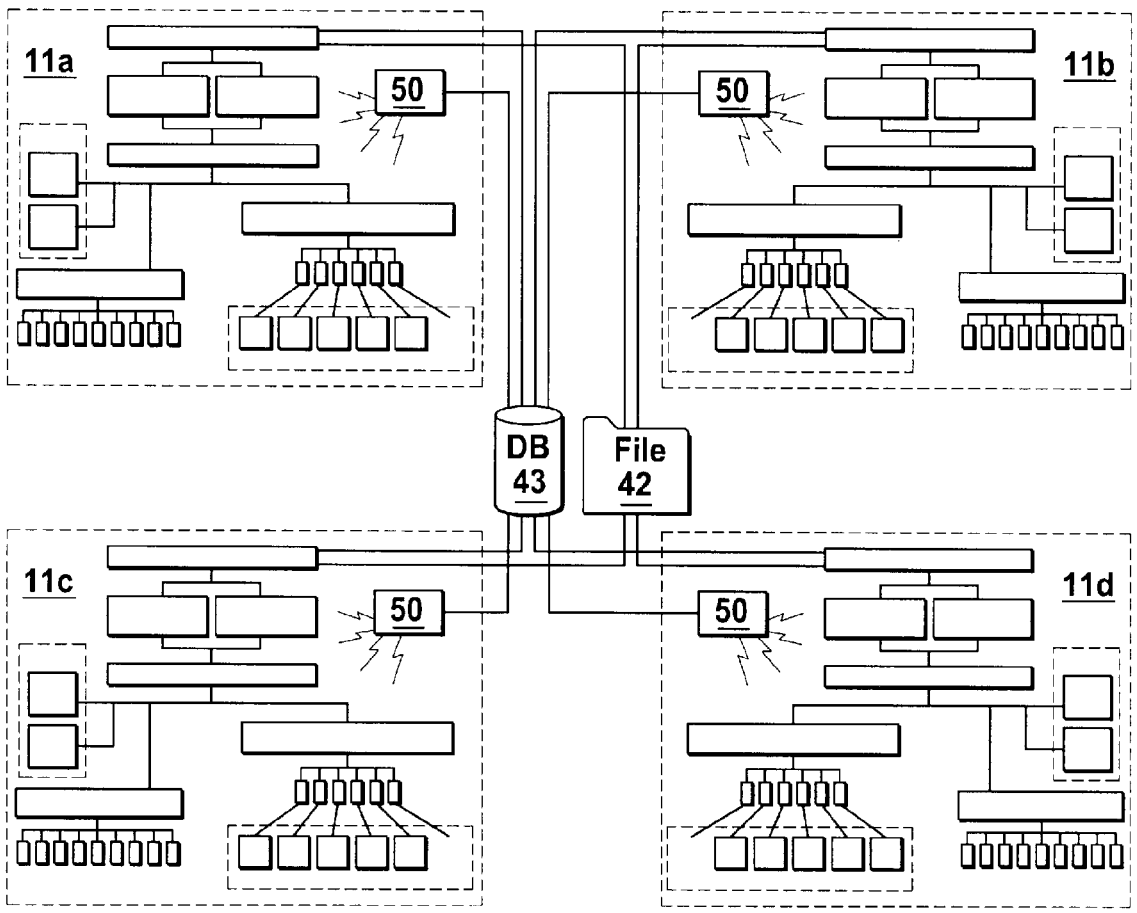

FIGS. 3A-3B depict embodiments of the invention utilizing a cluster manager 50 for high availability of content handling functionality. Referring to FIG. 3A, for example, there are shown two content handling engines 11a and 11b of the type shown in FIG. 2 and described above. The engines 11a and 11b operate in tandem and coordinate their actions so as to ensure high availability of the content handling engine functions—and, specifically, to ensure processing of queue content handling requests in the store 43.

In the embodiment of FIG. 3A, it achieves this by automated failover between/among engines 11a and 11b (in this regard it will be appreciated that, although only two engines 11a and 11b are shown in FIG. 3A, other embodiments may include additional engines that also operate in failure-over mode). Such failover mode processing can be achieved, for example, by utilizing the cluster manager 50 of each of the engines 11a and 11b to monitor state information in a common area of store 43. In the event of failure of the "active" engine 11a, the cluster manager 50 of the "passive" engine 11b notifies the other elements of the respective content handling systems to start up and take control of the work queue. It will be appreciated that failover mode processing can be achieved in other ways instead or in addition.

In the embodiment of FIG. 3B, the system achieves both high availability AND load balancing by providing multiple engines 11a and 11b operating simultaneously in a coordinated fashion to share the workload stored in the database/store 43. Like the embodiment of FIG. 3A, the cluster managers 50 of the engines 11a and 11b monitor state information in the common area of store 43 to achieve automatic load balancing and failover across the systems 11a and 11b.

Figure 4A:
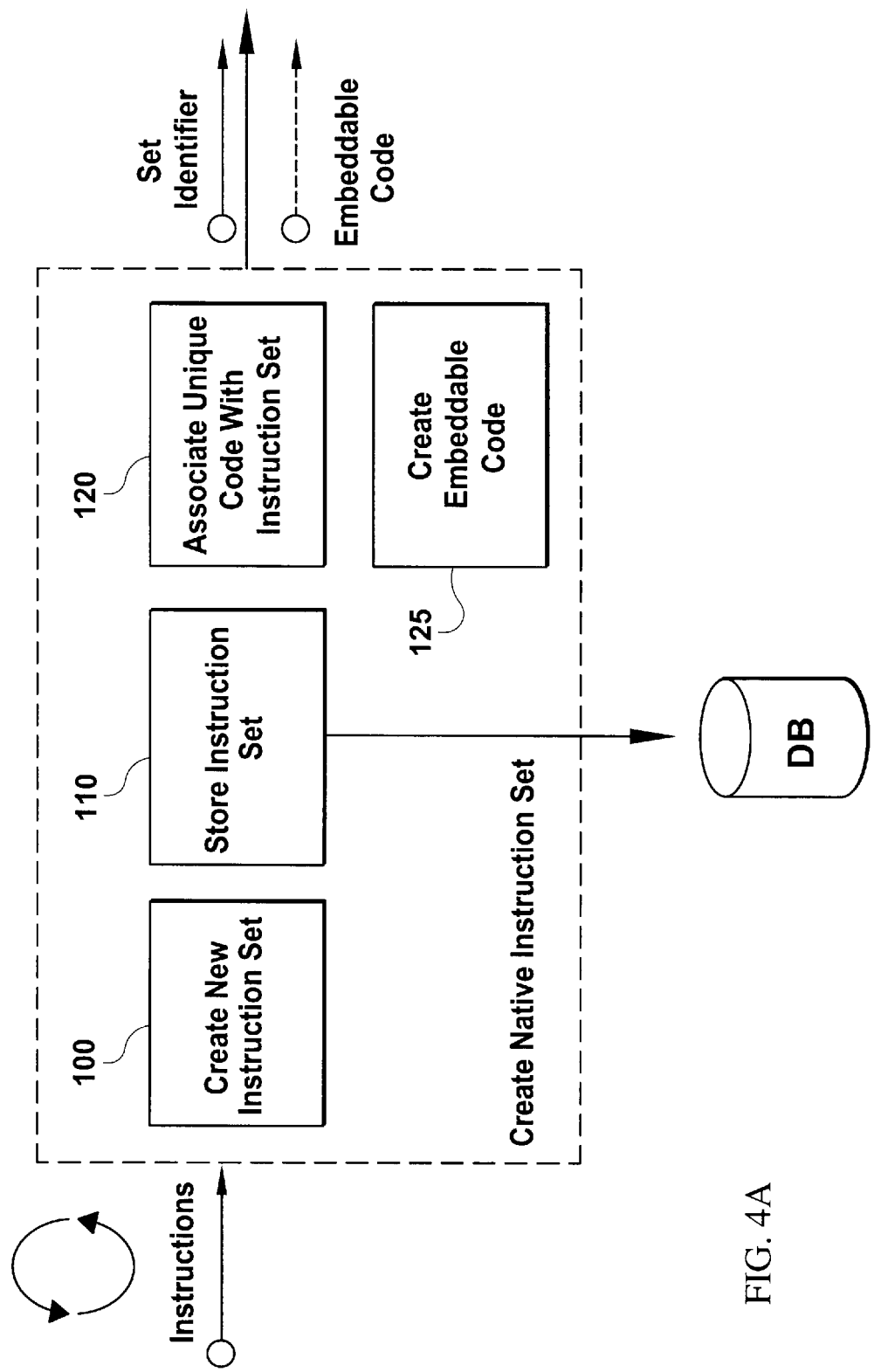
FIGS. 4A-4B depict operation of the content handling engine of FIG. 2.
Figure 4B:
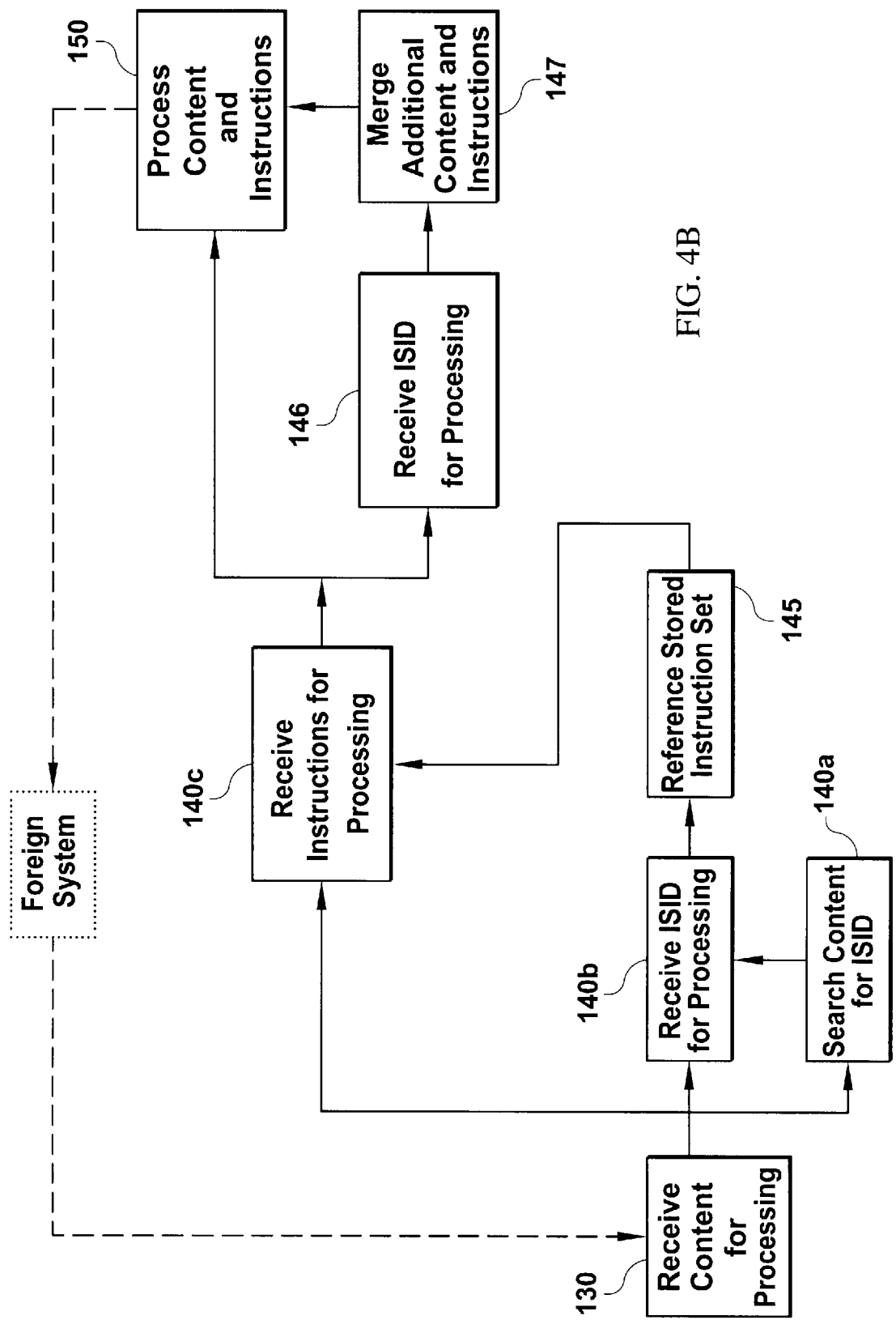

FIGS. 4A-4B depict operation of a content handling engine 11 according to one practice of the invention. The illustrated sequence of steps is just one of many with which the invention may be practiced. Thus, it may be practiced with a greater or lesser number of steps than those shown here, ordered as shown in the drawing or otherwise.

By way of overview, a content handling engine 11 executing in accord herewith distributes articles of content in accord with a workflow defined by a set of native instructions that are associated with codes embedded in the articles. Thus, for example, a code (e.g., "3434") embedded in a meta-data field of an Adobe PDF file may reference a set of native instructions specifying that PDF file should be delivered to a specified e-mail address in JPEG format and that a copy should be routed in text format to a specified document repository. By way of further example, when that code is embedded as spoken words in an audio file, the native instructions may specify that the audio file be converted to text (using voice-to-text conversion) before being sent to the specified e-mail address and/or repository.

Unlike document delivery systems currently available in the art, in which a cover sheet (or the like) bearing a routing code is removed from a document prior to its being routed to a recipient location, the content handling engine 11 of the illustrated system performs routing and other workflow processing on codes that are embedded in an article of content that form a portion of the content that is, itself, to be delivered to a recipient.

FIG. 4A depicts an initial, optional sequence of steps to create (or modify) and store an instruction set (e.g., in the illustrated database 43). This process is optional because a content handling request does not need to reference a stored instruction. Instead, for example, a new content handling request could itself supply the system 10 with all of the content and instructions necessary to perform the request, without any lookup or reference to a stored instruction set.

In step 100, a system administrator, user or other creates (or modifies) a native instruction set. In the illustrated embodiment, this is accomplished via interaction with message server 30, e.g., via a web client or administrative interface, executed directly on server 30 and/or via devices (e.g., desktop computers 20) coupled thereto, e.g., via an intranet 13, Internet, or otherwise.

Generally, native instruction sets define handling workflows for articles of digital content (e.g., PDF documents, movies, audio files, etc.,) or of content which can be converted to digital format (e.g., scannable paper, analog movies or audio recordings, X-rays, pictures. etc). More specifically, a native instruction set defines any combination of items selected from the following list: (i) delivery destinations (final or intermediate) for articles of content, (ii) format specification for articles of content, (iii) format conversions for articles of content (if necessary), and (iv) additional content to be included with delivery or other handling of articles of content. In certain embodiments, a native instruction set additionally defines (v) whether an article of content is to be transmitted securely to a delivery destination, and (vi) whether an audit trail of communications is to be recorded.

Delivery destinations, in the illustrated embodiment, are typically entered interactively, although they can be imported programmatically and/or via batch jobs (e.g., executed on the content handling engine 11), including, for example, importing a list of actual or potential destinations from a Microsoft Outlook or other LDAP (lightweight directory access protocol) or mail server, a mail client, a SharePoint™ server, a contact manager, or otherwise. In preferred embodiments, an application for interactive definition of destinations provides a graphical user interface (GUI) that is modeled after and/or works in conjunction with a corporate mail client or server, such as Outlook®, though it may be modeled after and/or work in conjunction with other applications. Other interactive applications may use command line interfaces or otherwise.

By way of non-limiting example, delivery destinations may be defined via e-mail addresses, telefax numbers, printer addresses, local or network file system folders, content repository addresses, or other electronic content destinations. One or more destinations can be specified for each recipient, indicating preferred and/or required addresses for receipt of articles of content of specified types.

Formats via which articles of content are transmitted to those destinations (and any desirable or necessary conversions) may be defined as well, e.g., where this is not otherwise obvious from or necessitated by the destination address. By way of example, a destination can be specified as receiving (i) word processing documents or spreadsheets in PDF format by e-mail at a designated e-mail address, (ii) image documents (e.g., scans) by fax at a designated fax number, and (iii) audio files in MP4 format and movie files in MPEG format at a designated media data store. Message Server 30 may utilize composer module 40a to perform these and other conversions.

Additional digital content may also be included for delivery with an article of content. For example, an instruction set (or its associated native code) can specify that a particular file is to be sent with all articles of content that are the subject of a workflow. By way of further example, an instruction set can specify that all content bearing native code "3117" that is sent to destination "john@smith.com" always include a file "greeting.wav," along with an .avi file with a clip of the originating enterprise's latest advertising campaign.

In step 110, the content message server 30 stores native instructions sets for execution by the server 30 during content processing, as discussed further below. In the illustrated embodiment, the native instruction sets are stored in data store 43, although they may be stored otherwise (e.g., in a secondary data store, etc.).

In step 120, the message server 30 associates a native code with each native instruction set. In the illustrated embodiment, a native code is a unique identifier used to reference (e.g., execute) a particular native instruction set during handling of content by the message server 30. In one embodiment, native codes serve as primary keys for "looking-up" native instruction sets stored in a relational database. Although a native code is typically only a reference identifier (or database key) to a native instruction set, the native code may also be the instructions set itself. Such is the case, for example, where the native code is a two-dimensional (2D) bar code (or other coding) that directly embodies and/or encodes the instruction set.

Although FIG. 4A depicts a process for creating a new native instruction set, it will be appreciated that a similar process can be utilized for modifying a pre-existing instruction set. To that end, rather than a step of "creating new instruction set" as shown in FIG. 4A, the process of modifying an instruction set would provide for accessing a pre-existing instruction set (e.g., from database 43) and permitting the operator to make desired modifications to that set. The process of modifying an instruction set might also forgo step 120, utilizing, instead, the code associated with the pre-existing instruction set.

In the illustrated embodiment, articles of content are associated with instruction sets via native codes (or corresponding foreign codes)—which are embedded into the articles, e.g., via the message server 30, an end user and/or a foreign system. For example, a native code (or a foreign code that is associated with a native code) can be embedded into a metadata field of a PDF document by a foreign system user executing Adobe Acrobat. Similarly, a native or foreign code can be embedded into a PDF document via the Adobe Acrobat commenting tool. By way of further example, a native or foreign code can be embedded into a meta-data field of an .avi file with Quicktime Pro or other movie editor. Those skilled in the art will appreciate that these are but a few methods for embedding native or foreign codes in content and many other methods fall within the scope of the invention.

Although not necessary, the message server 30 may optionally output an embedable form of the native code. This may be, for example, a printout of a label bearing that code for affixation to documents that are to be processed according to the corresponding instruction set. By way of further example, this may be clip buffer text containing that code for pasting into the content of a digital data file (or an associated metadata field) that is also to be so processed. By way of still further example, it may be a still image of the text form of the code for insertion in a video file or the audio form of the code to be inserted into an audio file to be so processed. By way of still further example, the outputted embedable code may comprise the instruction set itself, e.g., encoded as a 2-D barcode that can be embedded on a document to be scanned or into a PDF document. See step 125. These steps 100-125 may be executed just once, but they may also be revisited, e.g., in connection with updating an instruction set.

FIG. 4B depicts the processing of a content handling request by the message server 30 into a complete content handling transaction in a system according to one practice of the invention. Generally, an element in a valid and complete content handling transaction is that it must have both (i) instructions that define delivery format(s) and destination(s), e.g., as described above, as well as (ii) content to deliver. In the illustrated embodiment, the specific incoming content handling request may supply all the content and all the instructions necessary. Thus, by way of non-limiting example, the content may be a Microsoft Word file submitted called DOCUMENT.DOC, and the instructions may specify that it should be e-mailed to user company in PDF document format. In this case, there is no reference to a stored instruction set. See steps 130, 140c and 150, discussed further below.

The content and instructions, however, may be assembled differently to achieve the same end. It may occur, for example, that prior to submitting a content handling request to the system 10, the user previously created a stored instruction set (e.g., see steps illustrated in FIG. 4A) that defined that delivery should be to an e-mail to user@company.com and the content should be in PDF format. That stored instruction set would be able to be referenced by a unique identifier (e.g., an "instruction set identifier" or "ISID") for that instruction set. Thereafter, the content handling request could provide the content—DOCUMENT.DOC in our example—and a reference to the identifier of the stored instruction set and that these instructions should be used on the submitted content.

In fact all variations can exist where some or all of the content and/or instructions can be created and stored in a stored instruction set or supplied at the time of the content handling request. The stored instruction set is just a shorthand way of saving some of these elements so that they can be referenced and re-used as part of a content handling request.

A more detailed understanding of the foregoing process may be attained by reference to steps 130-150. As mentioned above, the illustrated sequence of steps is just one of many with which the invention may be practiced. Thus, it may be practiced with a greater or lesser number of steps than those shown here, ordered as shown in the drawing or otherwise.

In step 130, the message server 30 receives a content handling request. This may comprise one or more articles of content to be processed and/or instruction set identifiers (e.g., as where the instruction set, itself, specifies the articles to be processed). As discussed above, articles of content can be of any digital format, or they can be of any format which is convertible to a digital format. In the illustrated embodiment, the message server 30 receives the instruction set identifier and/or articles of content from illustrated client computers 20, e-mail server 15, content repositories 14a-14f, camera 25a, microphone 23a, etc., although such identifier and/or articles may be received from other sources, as well or in addition.

In step 140a, the message server 30 identifies a native code (or ISID) contained in a received article of content (or in an article of content specified by an instruction set identifier). In the illustrated embodiment, the message server 30 can identify such a code by a variety of means, including, by way of non-limiting example, bar code recognition, voice recognition, optical character recognition, and/or voice-to-text recognition, just to name a few. Typically, native codes are positioned at a predefined location within the content, although the message server 30 is capable of searching the entire article of content as necessary.

Once a native code has been identified, the message server 30 can reference and execute the instruction set associated with that code. See steps 145 and 150. In the illustrated embodiment, the message server 30 performs such referencing by either matching the native code to a pre-existing native instruction set (e.g., stored in data store 43), modifying the instruction set as necessary, or creating a new instruction set.

Alternatively, the message server 30 identifies a foreign code in an article of content (or in an article specified by an instruction set identifier). In the illustrated embodiment, a foreign code can be one created by a foreign system that has meaning to the foreign system vis-a-vis routing or other handling. This can include, by way of non-limiting example, user-written notes (e.g., "to Bob"), bar codes, text strings, content type codes, audio signals or voice commands (e.g., "give to Radiology Department") that are or can be associated with native codes and/or instruction sets. Along similar lines, a hash or "fingerprint" of its content may be treated as a foreign code that maps to a native code.

As with native codes, the message server 30 can search an entire article of content for a foreign code, e.g., via bar code recognition, voice recognition, optical character recognition, and/or voice-to-text recognition, or otherwise. Once a foreign code has been identified, the message server 30 translates it into a native code and executes the native instruction set associated with that code (e.g., based on a prior association established by the user, the system administrator or otherwise). See steps 145 and 150. In the illustrated embodiment, the message server 30 performs such translation by either matching the foreign code to a pre-existing native instruction set (e.g., stored in data store 43), modifying the instruction set as necessary, or creating a new instruction set.

In steps 140b and 140c, the message server 30 alternatively accepts a native or foreign code (step 140b) or native or foreign instruction set (step 140c) for execution on an article of content. By way of non-limiting example, a user may input the code or instruction set, via a GUI or otherwise, along with the article of content for processing. Upon accepting the code, the message server 30 executes the instruction set associated with that code on the article of content (see step 150).

In steps 146 and 147, an ISID is included in the content handling request, along with the submitted content (step 130) and instructions (step 140c), specifying additional content and/or instructions to be merged into the submitted content and instructions.

In step 150, as mentioned above, the message server 30 executes a native instruction set associated with a native code, e.g., specifying delivery destinations, format conversions, encrypting the article of content, etc., on an article of content.

These steps 130-150 may be executed just once, but many articles of content will be repeatedly processed. See dashed line from step 150 to step 130. For example, the instruction set may be a workflow that calls for intermediate processing by a foreign system (e.g., execution by a user, or filling-in a form, or addition of new content, etc.—all as defined by or permitted by the workflow), after which the content is re-presented to step 130 for further processing.

More specifically, and, again by way of example, such intermediate processing by a foreign system may include embedding a printable bar code in an Adobe PDF document, which bar code is a native code. When the document is printed, the bar code is printed too. After the printed copy is "processed" by the foreign system (e.g., user signs, attaches documents, etc), the paper copy is rescanned (by user/foreign system) and re-presented to the native system (i.e., to the content handling engine) for processing in steps 130-150. This could mean printing for further signatures, storage, sending to another department by e-mail, etc.

In some embodiments, the inventive system and methods for content handling and content routing as described above additionally provide for secure transmission of articles of content as described below. Secure transmission of articles of content can be implemented in the inventive system as an "add-on" package, e.g., a secure communication component 40f to include with components 40 and an upgrade of system software which enables integration of the secure communication component 40f into the content handling system 10. In some embodiments, methods and apparatus for secure transmission of articles of content are provided as an integral part of the content handling system 10. The secure communication component 40f can comprise a secure routing module 528 as described below.

In certain embodiments, an instruction set associated with an instruction set identifier (ISID or code) includes an instruction to transmit an article of content associated with the ISID or code using secure routing methods. Examples of secure routing methods are described in detail below. In particular, the component manager 36 can call upon the secure communication component 40f during workflow processing to encrypt an article of content. The call upon the secure communication component 40f can be in response to a directive received by the component manager 36 for secure transmission of the article of content. The directive can be received, e.g., from the message server 30 which has identified the ISID in the article of content or received an instruction for secure communication in a content handling request.

In certain embodiments, the enactment of secure transmission can be substantially wholly transparent to users of the system depicted in FIG. 1. An example relevant to professions subject to confidential and privileged communication requirements or regulations, e.g., medical and legal professions, illustrates this aspect of the inventive system and methods. Generally, in such professions, identification numbers or tags (ID's) are assigned to patients or clients, and the identification numbers or tags conform to a particular format within an enterprise. In various embodiments, the content handling engine can monitor any digitalized article of content for the presence of the client or patient ID. In such embodiments, the patient or client ID can serve as a code or ISID for the content handling engine. An instruction set associated with the identification of any patient or client ID can automatically enact secure transmission of the article of content bearing the patient or client ID. In some embodiments, the instruction set can further include automatically adding a confidentiality statement to the article of content. In this manner, any user of the system, e.g., lab technician, X-ray technician, paralegal, assistant, etc., need not be concerned with whether a "sensitive" document or article of content was transmitted securely, but only need confirm that the document or digital data bears a patient or client ID. In some embodiments, tailored instruction sets based on patient or client numbers can be particular to individual ID's, e.g., a tailored instruction set may provide a directive that a copy of the article of content be distributed securely to members of the client's legal team or to members of the patient's attending physicians.

The inventive content handling system and methods supports "mixed mode" and mixed format distribution as described in U.S. patent application Ser. No. 11/564,645, which is incorporated by reference. Additionally, the inventive content handling system supports mixed security distribution. In mixed mode distribution, creation of an article of content, e.g., by digitalization, can trigger or effect automatic transmission of pre-existing articles of content along with the newly created article of content. In mixed format distribution, at least one article of content is distributed in different formats to multiple recipients. The inventive secure routing system additionally provides for mixed security distribution. In mixed security distribution, at least one article of content is transmitted with different secure-communications protocols, e.g., secure transmission, non-secure transmission, and/or various levels of encryption, to multiple recipients, or at least two articles of content are transmitted according to different security protocols to a single recipient within a single transmission.

In certain embodiments, the inventive content handling system additionally provides for recordation of an electronic audit trail associated with content handling. In some embodiments, an audit trail is recorded for secure communications. In some embodiments, an audit trail is recorded for non-secure communications. In some embodiments, an audit trail is recorded for both secure and non-secure communications. In various embodiments an audit trail comprises a record of any or all of the following items: origination of an article of content, information within the article of content, time and date of origination of the article of content, time and date of handling of the article of content by the content handling system, destination(s) to which the article of content was transmitted, whether the article of content was encrypted prior to transmission, whether an electronic signature was provided with the article of content, whether a delivery receipt was associated with the article of content. In various embodiments, the audit trail is produced by the content handling engine and stored by the content handling engine in a data store, e.g., memory 43 or file 42. In certain embodiments, the audit trail is time stamped and digitally signed so as to render the recorded information verifiable, tamper resistant and tamper evident. The electronic audit trail can provide an alternative to paper-based, manual-signature systems of document delivery and can be non-repudiable.

An audit trail can be provided by message server 30. By way of non-limiting example, message server 30 can record audit trail information during workflow processing. Date and time information can be received by the message server 30 from a system date and timekeeper. Destination addresses can be provided from an instruction set associated with an article of content. The content of the article of content can be recorded by the message server 30 or information about the article of content can be obtained by the message server 30 from metadata associated with the article of content.

Details of methods which can be implemented for secure routing of articles of content are described below by way of methods and apparatus for securely communicating a message. It will be appreciated that a message can comprise an article of content, and visa versa. As indicated above, the methods can be integrated with the content handling system and be effected by an instruction set associated with a code or ISID, which is embedded in or associated with an article of content. A secure communication component 40f can provide encryption functionality as described below, as well as addition secure communication functionality known currently in the art and adapted for operation in accord with the teachings herein.

In various aspects, secure content routing embodied in the content handling system provides for a first communication module to securely communicate a message to a second communication module without any additional steps performed by a user of either the sending module or the receiving module. In one aspect, the invention includes a method having the step of the first communication module receiving a first message. The first message can be generated by a user, which may be a person or a communication device. The method also includes the step of automatically encrypting the first message to create a final encrypted message. The final encrypted message can only be decrypted by the second communication module. This automatic encryption is transparent to the user, thereby enabling the secure communication of a message without any steps performed by the user (of the sending or receiving device) besides the usual steps to send/receive a message.

The first message may be an e-mail or any other type of message that can be communicated between the first and second communication modules. Moreover, the first message may be transmitted to the first communication module in response to a rule associated with the destination address of the first message. To create the final encrypted message, the first communication module can create a second message having the first message embedded in the second message. The first communication module may then digitally sign the second message to create a first encrypted message. This digital signature can be decrypted with the public key associated with the first communication module. The first communication module can also generate a third message having the first encrypted message embedded within the third message. The final encrypted message is created when the first communication module digitally signs the third message. The final encrypted message can only be decrypted by a particular private key.

Additionally, the method may include the step of decrypting the final encrypted message before transmitting the decrypted message to the proper recipient. Similar to the encryption, the decryption is transparent to the recipient.

In another aspect, the invention relates to an apparatus for securely communicating a message. The apparatus comprises a first communication module and a first secure message routing module. The first communication module receives a first message generated by a user. The first secure message routing module automatically encrypts the first message to create a final encrypted message so that only a particular receiver of the final encrypted message can decrypt the final encrypted message. Moreover, the automatic encryption is transparent to the user.

The first communication module may be a server, such as a master e-mail server. Further, the particular receiver of the final encrypted message may be a second secure message routing module, such as on a client computer or satellite e-mail server. Moreover, the particular receiver may be the module that decrypts the message before transmitting the message to the intended recipient.

The second secure message routing module may include a relay module, a secure reply module, and/or a message submit module. The relay module can enable the second secure message routing module to receive the final encrypted message from the first communication module. Furthermore, the secure reply module can enable sending a secure reply message to the first communication module in response to the final encrypted message. The message submit module can enable a new message addressed to a recipient to be transmitted to the first communication module for security processing before transmitting to the recipient.

In another aspect, the invention relates to a method for securely communicating a message between a first communication module and a second communication module. The method includes the step of receiving a first encrypted message sent by a first user. The first communication module receives the first encrypted message. The method also includes the step of receiving a second message generated by a second user. The first communication module receives the second message. The first user is in communication with the second communication module, while the second user is in communication with the first communication module. The method additionally includes the step of automatically decrypting the final encrypted message to obtain a first message addressed to the second user. Moreover, the second message is automatically encrypted to create a second encrypted message so that only the second communication module can decrypt the second encrypted message. Further, the automatic encryption and the automatic decryption are transparent to the first and second users.

Figure 5:
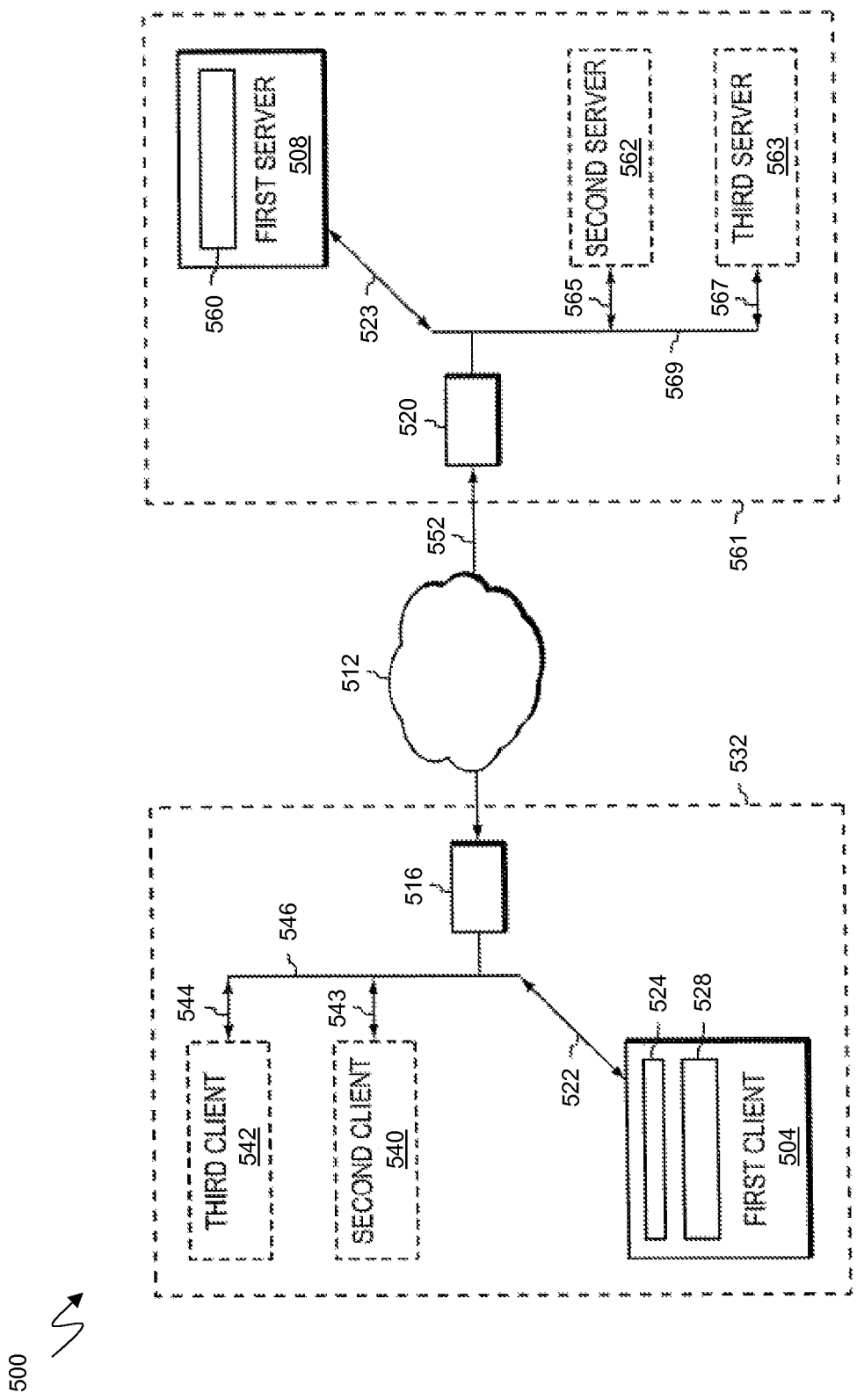
FIG. 5 is a block diagram of an embodiment of a secure message routing system.

Referring to FIG. 5, a secure message routing system 500 is a system that includes a first client computer ("client") 504 in communication with a first server computer ("server") 508 over a network 512. The client 504 communicates with a client router 516 to deliver and receive messages over the network 512. Likewise, the server 508 communicates with a server router 520 to deliver and receive messages over the network 512. A message may be an e-mail, a download or upload, an alarm, or any other type of communication between two devices.

The client 504 can be any device capable of communicating over the network 512. For example, the client 504 may be a personal computer (e.g., based on a microprocessor from the 680x0 family, PowerPC, PA-RISC, MIPS families, an Intel microprocessor, an Advanced Micro Devices microprocessor), smart or dumb terminal, network computer, wireless device, information appliance, workstation, minicomputer, or mainframe computer. Operating systems supported by the client 504 can include any member of the WINDOWS family of operating systems from Microsoft Corporation of Redmond, Wash., Macintosh operating system, JavaOS, and various varieties of Unix (e.g., Solaris, SunOS, Linux, HP-UX, A/IX, and BSD-based distributions).

The routers 516, 520 may be any device that can direct messages to and from the network 512, such as a router, firewall, gateway, or relay. Additionally, the client router 516 communicates with the client 504 over a first client-router communication channel 522. Moreover, the server router 520 communicates with the server 508 over a first server-router communication channel 523.

The client 504 can also include a web browser 524 to communicate with the server 508 over the network. For instance, the web browser 524 may be INTERNET EXPLORER.RTM. developed by Microsoft Corporation in Redmond, Wash. or NETSCAPE NAVIGATOR.RTM. developed by Netscape Communications Corporation of Mountain View, Calif.

Additionally, the client 504 includes a secure message routing module 528. Examples of the secure message routing module 528 include an independent computer or a software module executing on the client 504. The secure message routing module 528 provides security and stability to messages transmitted from the client 504 to the server 508. In one embodiment, the secure message routing module 528 prevents modification of a message. Additionally, the secure message routing module 528 also enables seamless integration of securely transmitting and receiving messages. This integration therefore enables a user to send and receive a message in the typical manner. Thus, the secure communication of a message between the first client 504 and the first server 508 is transparent to the procedures performed by a user. Examples of the secure message routing module 528 include an independent computer or a software module executing on the client 504. Examples of the secure message routing module 528 include an independent computer or a software module executing on the client 504.

The client 504 and the client router 516 may be part of a client network 532. The client network 532 can also include any number of additional clients, such as a second client 540 and a third client 542. In particular, the second client 540 can communicate with the client router 516 over a second client-router communication channel 543. Moreover, the third client 542 can communicate with the client router 516 over a third client-router communication channel 544. In one embodiment, the client-router communication channels 522, 543, 544 connect to a main client-router communication channel 546. Thus, the second and third clients 540, 542 can communicate with each other using the main client-router communication channel 546.

The second and third clients 540, 542 can also have an associated web browser and may communicate over the network 512 via the client router 516. Examples of the second and third client 540, 542 include an e-mail content server, an e-mail exchange server developed by Microsoft Corporation of Redmond, Wash., or a desktop computer operated by a user. Additionally, although the secure message routing module 528 is described above and below with respect to the first client 504, the description may equally apply to any of the other clients 540, 542.

The client 504 may communicate with the server 508 over the network 512. The network 512 can be a local-area network (LAN), a wide area network (WAN), or a network of networks such as the Internet or the Web. In particular, the client 504 may use the client router 516 to communicate with the server router 520 over a client-server communication channel 552 that passes through the network 512. Example embodiments of the client-server communication channel 552 includes standard telephone lines, LAN or WAN links (e.g., T1, T3, 56 kb, X.25), broadband connections (ISDN, Frame Relay, ATM), and wireless connections. The connections over the client-server communication channel 552 can be established using a variety of communication protocols (e.g., HTTP, HTTPS, TCP/IP, IPX, SPX, NetBIOS, Ethernet, RS232, messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., manufacturing message specification (MMS) protocol, the Secure Multi-Purpose Internet Mail Extensions (S/MIME) protocol, and direct asynchronous connections). Additionally, the communication channels 543, 544, 546 may be any of the previously described channels.

The server 508 may be a device that communicates with the client 504. The server 508 can also host one or more programs or files that the client 504 can access. For example, the server 508 may contain a web service directory enabling the advertising and providing of web services to the client 504 over the web. The server 508 may additionally (or alternatively) provide an application to the client 504. For example, the server 508 may provide a word processing program, such as Word developed by Microsoft Corporation of Redmond, Wash., to the client 504.

The server 508 also includes a secure message routing module 560. To ensure secure communications with the client 504, the secure message routing module 560 of the server 508 can communicate with the module 528 of the client 504 using digital signatures, encryption, and authentication.

The server 508 can be any of the communicating devices described for the client 504. Further, the server 508 may be a member of a server farm 561, or server network, which is a logical group of one or more servers that are administered as a single entity. In one embodiment, the server farm 561 includes multiple servers, such as a second server 562 and a third server 563. The second and third servers 562, 563 communicate over the network 512 via the server router 520. In particular, the second server 562 can communicate with the server router 520 over a second server-router communication channel 565. Moreover, the third server 563 can communicate with the server router 520 over a third server-router communication channel 567. In one embodiment, the server-router communication channels 523, 565, 567 connect to a main server-router communication channel 569. Thus, the second and third servers 565, 567 can communicate with each other using the main server-router communication channel 569.

Although FIG. 5 illustrates three servers 508, 562, 563, the server farm 561 can have any number of servers. In other embodiments, the server farm 561 is a protected network that is inaccessible by unauthorized individuals, such as corporate Intranet, Virtual Private Network (VPN), or secure extranet. Additionally, the servers making up the server farm 561 may communicate over any of the networks described above (e.g., WAN, LAN) using any of the protocols discussed.

In one embodiment, the server 508 is designated as the "master" communication device ("master server 508"). The secure message routing module 560 of the master server 508 can manage "satellite" devices. A satellite device can be any communication device, such as the first client 508, that has a secure message routing module that the master server 508 manages. The master server 508 can also "create" a satellite device, such as by downloading the requisite software to the proper computer. For example, the master server 508 can communicate with the first client 504 to download the secure message routing module 528 onto the first client 504.

If several communication devices, such as the second and third clients 540, 542, included secure message routing modules, then the master server 508 may communicate with multiple satellite devices. Further, each satellite device may not be able to communicate with the other satellite devices. Instead, the satellite device may only be able to communicate with the master server 508 used to "create" the satellite device. Thus, using the same example as above, the first client 504 may only be able to communicate with the first server 508 after the first server 508 installs the secure message routing module 528 onto the first client 504.

Although the server 508 is described above and below as having the secure message routing module 560 that transmits the messages to the secure message routing module 528 of the client 504 and is therefore the master device, any other device, such as the client 504, can be the master device. Likewise, any communication device, such as the server 508, can also be a satellite device.

Moreover, either or both secure message routing modules 528, 560 enable secure communications via automatic encryption/decryption without a user's intervention. Therefore, the user does not need to perform any actions to reap the security benefits provided by the secure message routing modules 528, 560.

Figure 6:
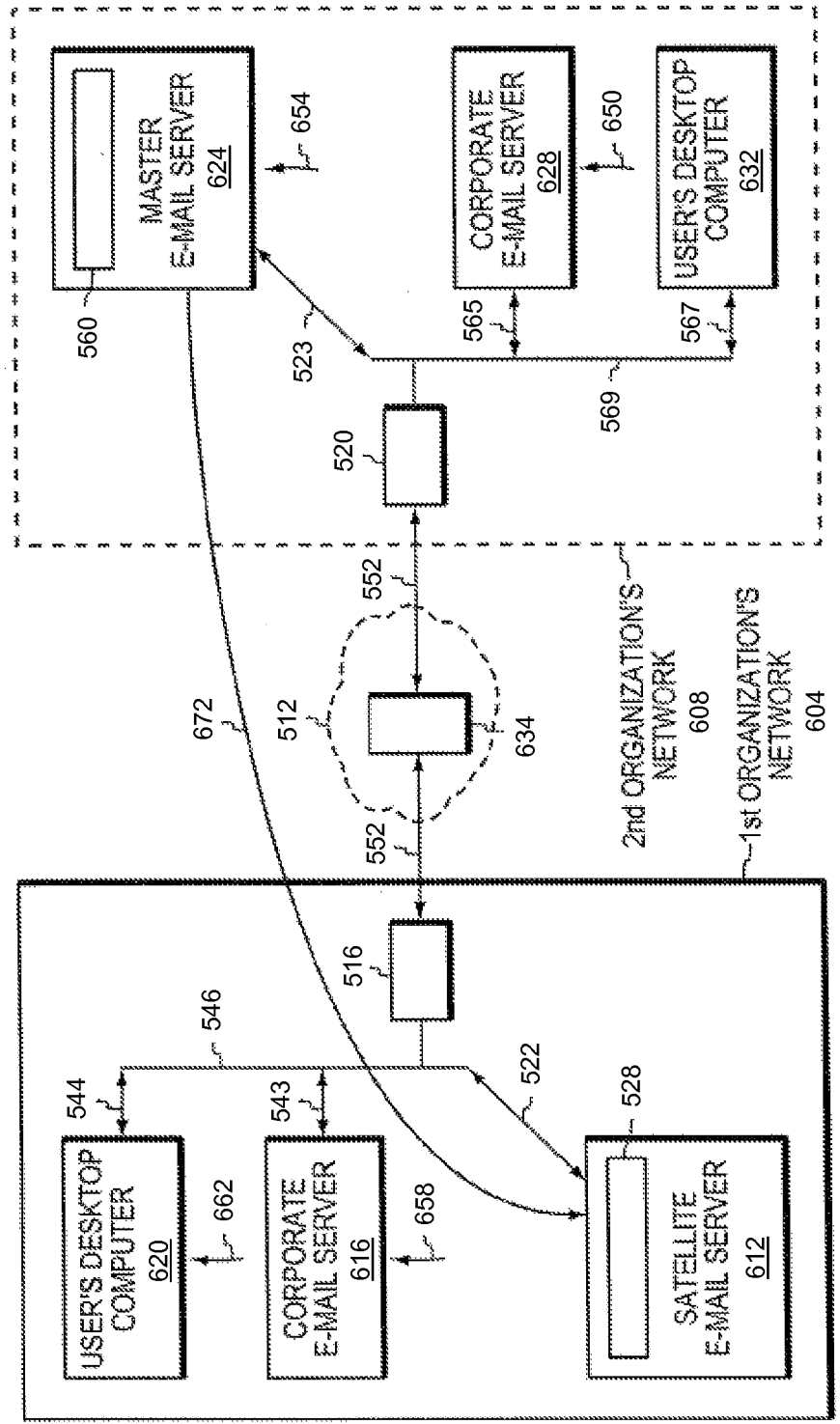
FIG. 6 is a block diagram of an embodiment of a secure message routing system having a master e-mail server and a satellite e-mail server.

Referring to FIG. 6, an exemplary secure message routing system 200 enables the secure transmission of messages (with or without message attachments) between a first organization and a second organization. The secure message routing system 200 includes a first organization's network 604 and a second organization's network 608.

The first organization's network 604 includes a satellite e-mail server 612, a corporate e-mail server 616, and a desktop computer 620 operated by a user. Typical communications occur over the network 512 via the client router 516. The satellite e-mail server 612 includes the secure message routing module 528 and is an illustration of the first client 504. The corporate e-mail server 616, represented above as the second client 540, is a computer that typically sends and receives e-mail messages over the network 512. The desktop computer 620 (e.g., the third client 542) is a computer that can connect to the corporate e-mail server 616, such as via a modem or Digital Subscriber Line (DSL).

Similarly, the second organization's network 608 includes a master e-mail server 624 (e.g., the first server 508 above), a corporate e-mail server 628, and a desktop computer 632. The master e-mail server 624 at the second organization is configured to communicate with the satellite e-mail server 612 at the first organization. Furthermore, the corporate e-mail server 628 of the second organization (i.e., in its network 608) is configured to recognize e-mail messages that are to be sent to the first organization's network 604 and route them to the master e-mail server 624 for subsequent secure communication.

Additionally, the master e-mail server 624 and the satellite e-mail server 612 can use the Simple Mail Transfer Protocol (SMTP) to communicate e-mail messages. Moreover, the network 512 may include an SMTP server 634 to direct messages to the correct destination using the SMTP protocol.

Each secure message routing module 528, 560 can additionally have one or more configuration files that designates the message destination. Although described below in view of the secure message routing module 528 of the satellite e-mail server 612, the description can equally apply to the secure message routing module 560 of the master e-mail server 624.

The configuration file of the secure message routing module 528 of the satellite e-mail server 612 includes the address (e.g., the Domain Name Service (DNS) address) of the secure message routing module 560 of the master e-mail server 624. The configuration file can also include the address (e.g., the DNS address) of the secure message routing module 528 (e.g., the address of the satellite e-mail server 612) and the e-mail domain that the secure message routing module 528 (e.g., satellite e-mail server 612) supports. The e-mail domain that the secure message routing module 528 supports is the domain that appears in e-mail messages sent to the client or server hosting the secure message routing module 528 (e.g., the satellite e-mail server 612). Thus, if e-mails are transmitted to a user at the address of user@first organization.com, the domain that the satellite e-mail server 612 supports is first_organization.com. The configuration file may also include a challenge phrase for the installation of a digital certificate on the satellite e-mail server 612, as discussed in more detail below.

Figure 7:
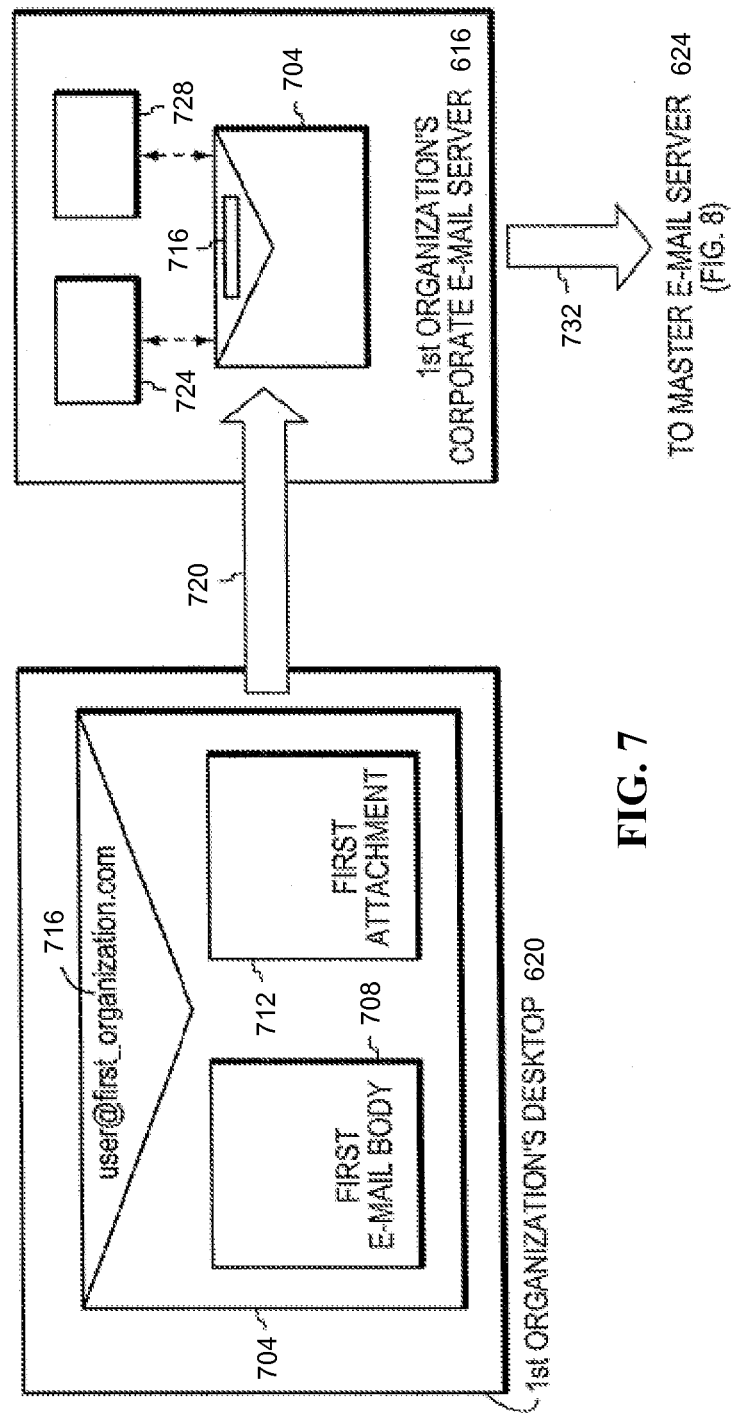
FIG. 7 is a block diagram of an embodiment of the flow of an e-mail message before being sent to the master e-mail server for subsequent delivery to the satellite e-mail server.
Figure 8:
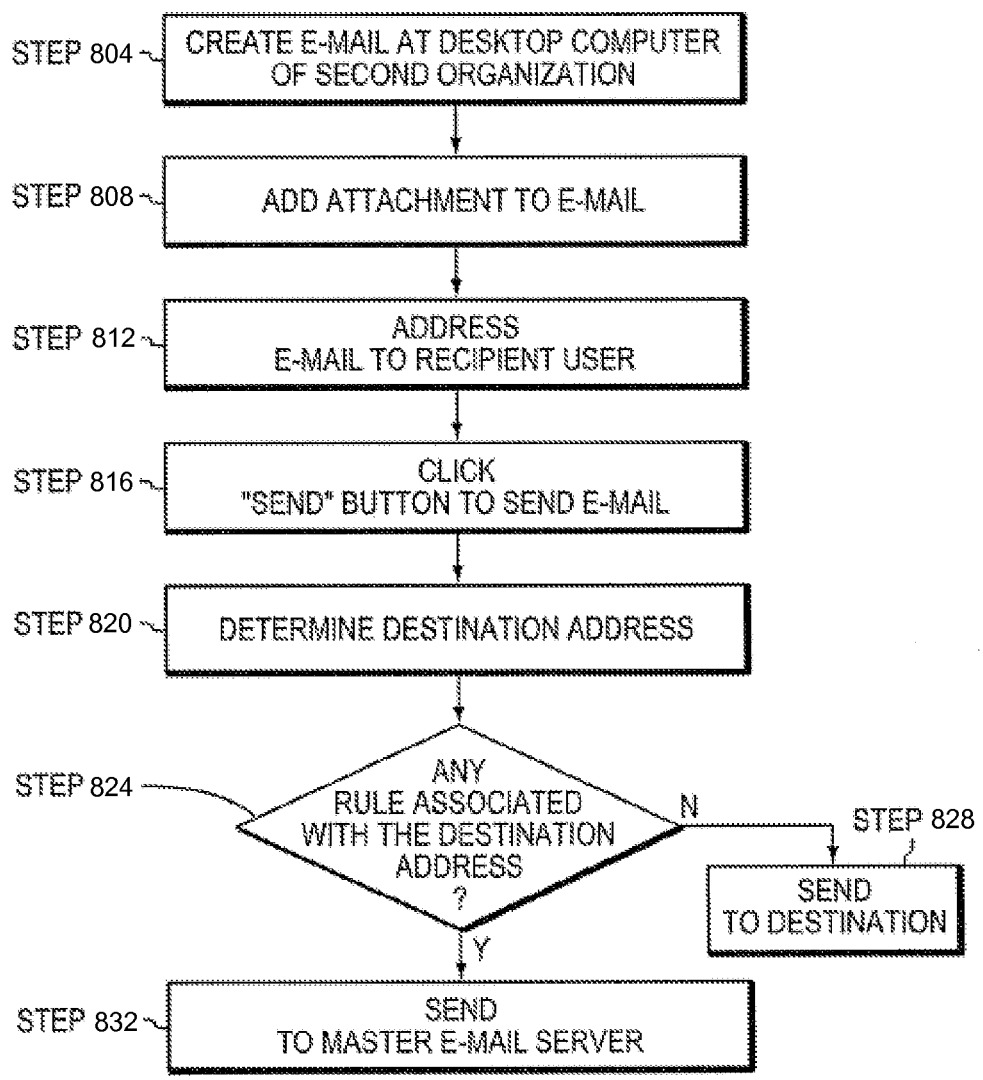
FIG. 8 is a flow diagram illustrating an embodiment of the steps performed by the secure message routing system to send the message to the master e-mail server for subsequent delivery to the satellite e-mail server.

Also referring to FIG. 7 and FIG. 8, the steps taken by the secure message routing system 200 to securely communicate an e-mail message from the master e-mail server 624 in the second organization's network 608 to a destination within the first organization's network without additional user intervention (besides the typical message sending and receiving actions) are shown. The user operating the desktop 632 in the second organization's network 608 creates a first e-mail 704 having a first e-mail body 708 (STEP 804). The user may also add a first attachment 712 to the e-mail 704 (STEP 808), such as an audio file, a word processing document, a spreadsheet, a graphic, a picture, a table or chart, etc. Although illustrated with one attachment 712, any number of attachments 712 of any type of file may be added to the e-mail 704, perhaps limited by system limitations (e.g., memory limitations or bandwidth limitations).

To send the first e-mail 704 to the user operating the desktop 620 at the first organization, the master e-mail server 624 that created the first e-mail 704 addresses it to the recipient user's address 716, such as user@first organization.com (STEP 812). As with a typical e-mail, the user then clicks a button, such as a "Send" button, on the desktop software to send the message 704 (STEP 816).

The message 704 then travels to the corporate e-mail server 616 for delivery over the network 512, as shown with arrows 650 and 720. The corporate e-mail server 616 checks the recipient address 716 of the first e-mail 704 to determine the destination of the message 704 (STEP 820). Upon review of the destination address 716, the corporate e-mail server 616 determines if the recipient address user@first_organization.com matches any rules that the corporate e-mail server 616 has relating to the recipient address 716 (STEP 824).

For example, the corporate e-mail server 616 may have a recipient address table 724 that includes a list of network addresses (e.g., Internet Protocol (IP) addresses) that the corporate e-mail server 616 compares with the recipient address 716 for a match. If no address in the recipient address table 724 matches the recipient address 716, the corporate e-mail server 616 then transmits the message over the network 512 (STEP 828) to the intended recipient. If, however, the corporate e-mail server 616 finds a matching address in the recipient address table 724, the corporate e-mail server 616 then searches for a rule associated with the recipient address in a rules table 728. The tables 724, 728 may be part of the same database or may be separate databases. Moreover, the tables 724, 728 may be stored locally on the corporate e-mail server 616 or may be external to the corporate e-mail server 616.

If a rule exists that relates to the recipient address 716, the corporate e-mail server 616 executes the rule. The rule can state, for example, that all messages destined for the first organization's network 604 should be routed to the second organization's master e-mail server 624 (STEP 832). Additionally, although described above and below as a rule designating that all messages destined for the first organization's network 604 must be sent to the second organization's master e-mail server 624, the rules may state any destination for a message or any modification of the message before transmittal to any destination. Further, instead of searching through the recipient address table 724 and the rules table 728, the corporate e-mail server 616 may only compare the recipient address 716 to the rules table 728 to determine if a rule exists that is associated with the recipient address 716. The corporate e-mail server 616 then sends the first message 704 to the master e-mail server 624 (STEP 832), as shown with arrows 654 and 732.

Figure 9:
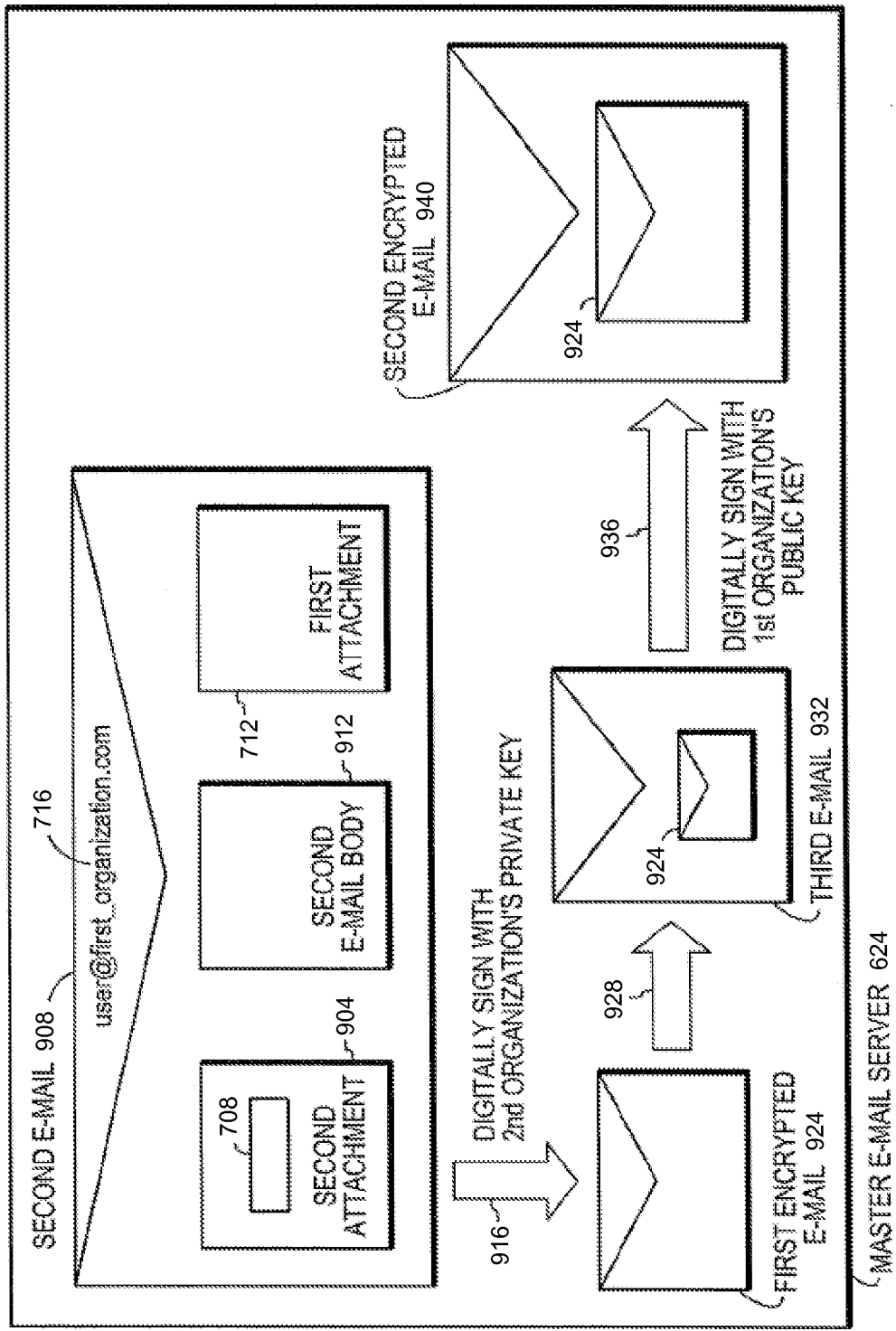
FIG. 9 is a block diagram of an embodiment of the flow of the e-mail upon processing by the master e-mail server.
Figure 10:
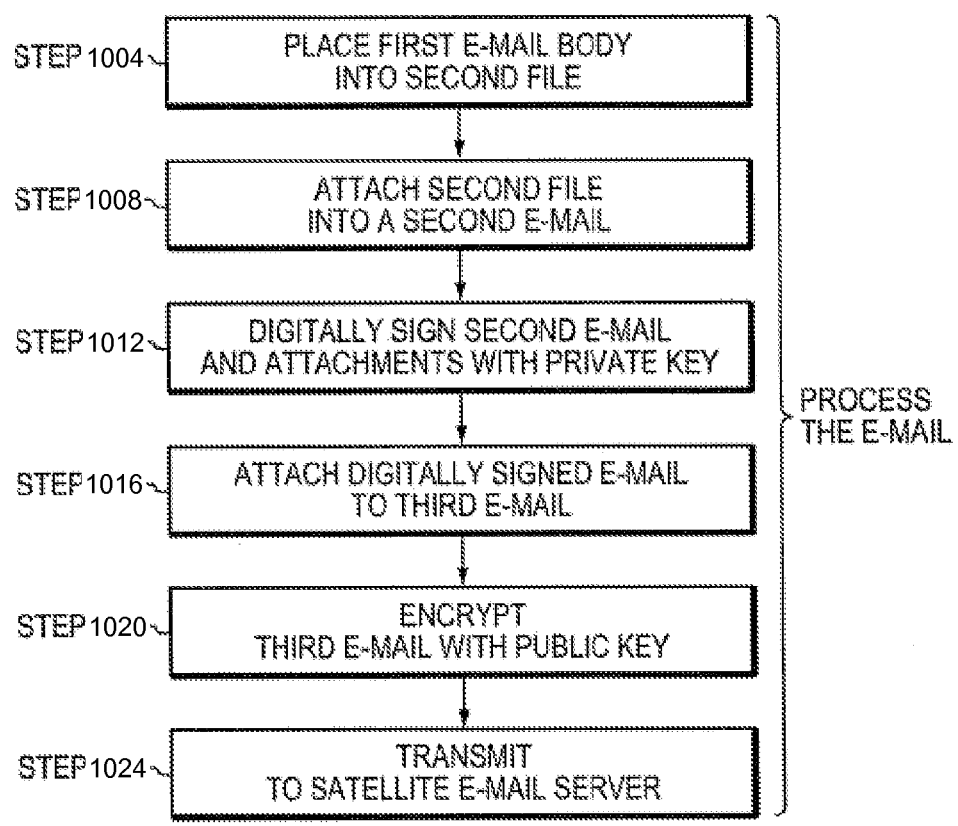
FIG. 10 is a flow diagram illustrating an embodiment of the steps performed by the master e-mail server to send the e-mail message to the satellite e-mail server.

Referring to FIG. 9 and FIG. 10, the master e-mail server 624 then processes the message 704. The processing includes placing the first e-mail body 708 into another, second attachment or file 904 (STEP 1004). The second file 904 may be a graphical file, textual file, e-mail, sound file, or any other file that can be transmitted across the network 512. The master e-mail server 624 then attaches the second file 904 to a second e-mail 908 (STEP 1008). In one embodiment, the master e-mail server 624 generates a second e-mail body 912 for the second e-mail 908, such as text stating that the second e-mail 908 is delivered from the master e-mail server 624. Further, the second e-mail 908 also includes the first attachment 712 that the user wants to send to the recipient address 716. The master e-mail server 624 then digitally signs the second e-mail message 908 and the attachments 712, 904 with the second organization's private encryption key, as shown with arrow 916 (STEP 1012).

In particular, the master e-mail server 624 can communicate with a certification authority (CA) to receive a secure digital certificate. The CA verifies the identity of the master e-mail server 624 and then issues the certificate. The certificate is digitally signed by the CA, thereby providing authenticity. The certificate has two components—a public key and a private key. The public key is available to anyone and can be used to verify information received from the master e-mail server 624. The private key is supposed to remain private so that the certificate remains trustworthy.

To send secure e-mail messages to the satellite e-mail server 612, the master e-mail server 624 can use the Secure Multi-Purpose Internet Mail Extensions (S/MIME) protocol. The S/MIME protocol can support the encryption of messages and the application of digital signatures via the certificate. Moreover, S/MIME digital signatures are applied to the entire e-mail message 908, including the e-mail body 912 and the attachments 712, 904. The digital signing with the second organization's encryption key creates a first encrypted e-mail 924.

In another embodiment, if the master e-mail server 624 determines that the recipient of the second e-mail 908 (e.g., the desktop 620) does not have the capability to verify the digital signature (e.g., cannot obtain the public key of the second organization), the master e-mail server 624 attaches a digital signature to the e-mail message, such as in a MIME file (e.g., smime.p7s). The presence of this file does not prevent or impede the user's ability to view the contents of the e-mail 908.

As shown with arrow 928, the master e-mail server 624 then attaches the first encrypted e-mail 924, including the first and second attachments 712, 904, to a third e-mail message 932 (STEP 1016). The master e-mail server 624 then encrypts the third message 932 with the first organization's public key, as shown with arrow 936, to create a second encrypted e-mail 940, or final encrypted message (STEP 1020). The master e-mail server 624 then transmits the second encrypted e-mail 940 to the first organization's satellite e-mail server 612 over the network 512, as shown with arrow 672 in FIG. 6 (STEP 1024).

Figure 11:
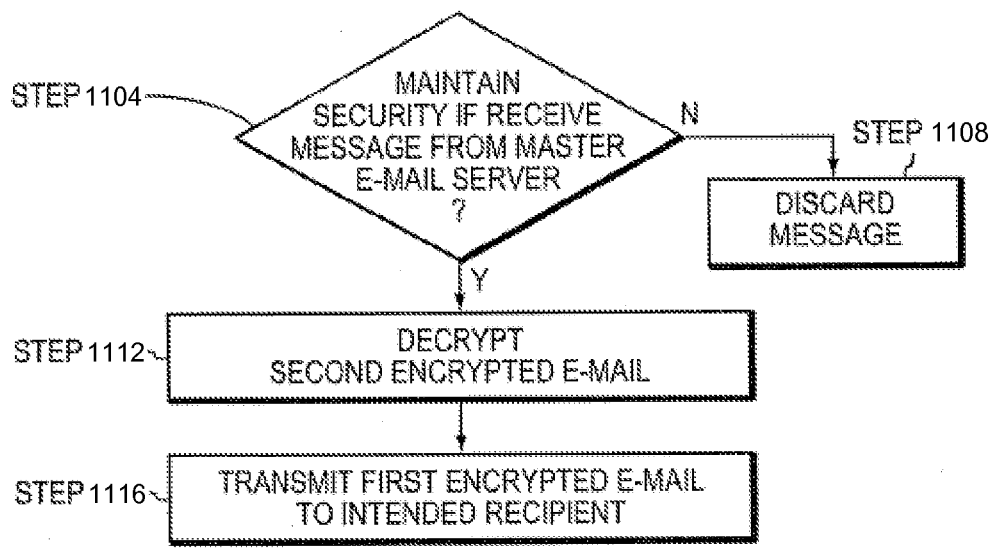
FIG. 11 is a flow diagram of an embodiment of the steps performed by the satellite e-mail server upon receipt of a message from the master e-mail server.

Referring to FIG. 11, the first organization's satellite e-mail server 612 receives the second encrypted e-mail 940 and determines whether it can receive messages from the second organization's master e-mail server 624 (STEP 1104). For example, the satellite e-mail server 612 may check its configuration file to determine the address the satellite e-mail server 612 can receive messages from to maintain security.

If the satellite e-mail server 612 cannot receive messages from the master e-mail server 624, then the satellite e-mail server 612 discards any received message (STEP 1108). If, however, the satellite e-mail server 612 determines that it can receive messages from the second organization's master e-mail server 624, the satellite e-mail server 612 decrypts the second encrypted e-mail 940 (STEP 1112). Because the master e-mail server 624 encrypted the third e-mail 932 using the first organization's public key, the satellite e-mail server 612 decrypts the second encrypted e-mail 940 using its private key. Therefore, assuming that the private key of the satellite e-mail server 612 is secure and confidential (i.e., only the satellite e-mail server 612 "knows" the private key), the second encrypted e-mail 940 can only be decrypted by the satellite e-mail server 612. The server 612 then extracts the first encrypted e-mail 924 and transmits the e-mail 924 to the first organization's corporate e-mail server 616 over the main client-router communication channel 546 and the second client-router communication channel 543 (shown with arrow 658 in FIG. 6). The corporate e-mail server 616 performs its normal operations when receiving the first encrypted e-mail 924, such as scanning for viruses. The corporate e-mail server 616 then examines the recipient address of the first encrypted e-mail 924 and subsequently delivers the e-mail 924 to the user operating the desktop 620 over the main client-router communication channel 546 and the third client-router communication channel 544 (shown with arrow 662 in FIG. 6) (STEP 1116).

The desktop 620 receives the first encrypted e-mail 924. The desktop 620 then verifies the digital signature of the first encrypted e-mail 924. Because the master e-mail server 624 encrypted the second e-mail 908 with the second organization's private key, the desktop 620 needs the second organization's public key to decrypt the first encrypted e-mail 924. This key is public and typically available to anyone. Therefore, the desktop 620 obtains the public key of the second organization and uses this public key to extract the second e-mail 908 from the first encrypted e-mail 924.

Figure 12:
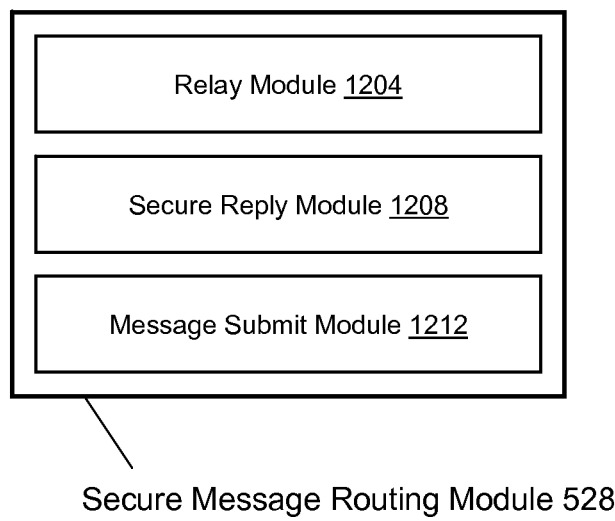
FIG. 12 is a block diagram of an embodiment of a secure message routing module of the secure message routing system.
Figure 13:
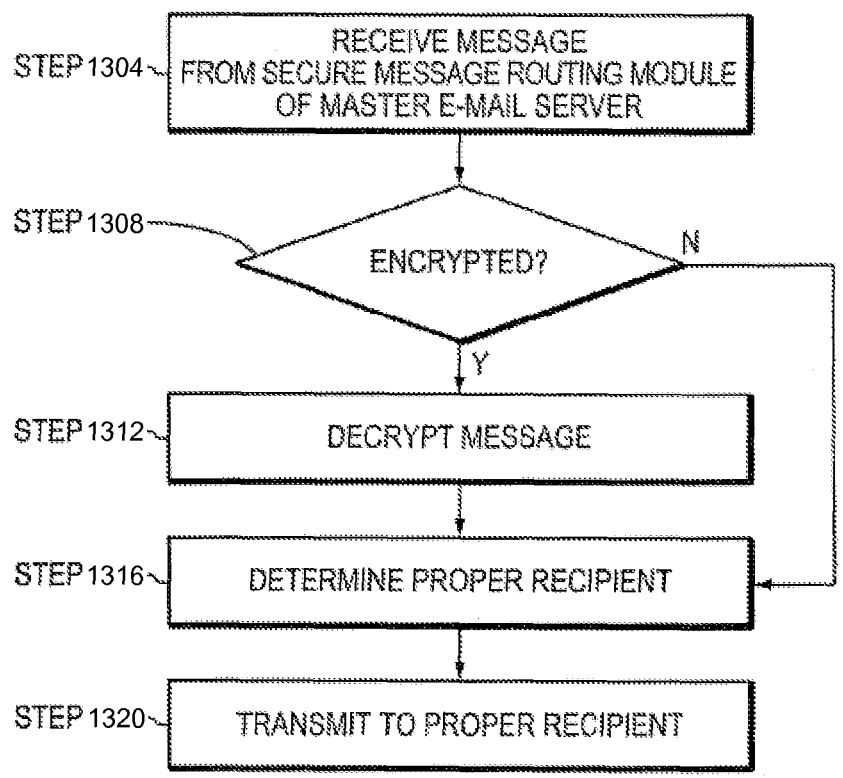
FIG. 13 is a more detailed flow diagram illustrating an embodiment of the steps performed by the satellite e-mail server upon receipt of a message from the master e-mail server.

In more detail about the satellite e-mail server's processing of messages upon receipt and referring to FIG. 12 and FIG. 13, the secure message routing module 528 of the satellite e-mail server 612 includes a relay module 1204, a secure reply module 1208, and a message submit module 1212. The relay module 1204 enables the secure message routing module 528 to receive secure, encrypted messages from the master e-mail server 624, such as the second encrypted e-mail 940 (STEP 1304). Upon receipt, the relay module 1204 attempts to determine the intended recipient, such as the desktop computer 620, of the message 940. Thus, the relay module 1204 determines if the secure message routing module 560 of the master e-mail server 624 encrypted the second encrypted e-mail 940 before transmitting it (STEP 1308).

If the master e-mail server 624 encrypted the message 940, the relay module 1204 decrypts the second encrypted e-mail 940 (STEP 1312). The relay module 1204 then determines that the desktop 620 is the intended recipient of the third e-mail 932 (STEP 1316). Once this is determined, the relay module 1204 transmits the third e-mail 932 to the corporate e-mail server 616 for subsequent processing before the message's transmission to the desktop 620 (STEP 1320). Thus, the secure message routing modules 528, 560 enable a message to be communicated securely without the recipient user having to perform any additional steps relative to the normal steps taken to send and receive a message.

The secure reply module 1208 enables the secure communication of a reply to the second encrypted e-mail 940 that the master e-mail server 624 sent. For example, upon receipt of the second encrypted e-mail 940, the secure reply module 1208 can format the "REPLYTO" field of a response e-mail message. When the user of the desktop 620 replies to the second e-mail 908 (e.g., after the second encrypted e-mail 940 and the first encrypted e-mail 924 are decrypted), the desktop 620 sends the response e-mail to the corporate e-mail server 616. The corporate e-mail server 616 determines that the recipient of the response e-mail is the master e-mail server 624 and therefore communicates the response e-mail to the satellite e-mail server 612. In one embodiment, the corporate e-mail server 616 of the first organization is configured to recognize messages with particular recipient addresses (e.g., the master e-mail server 624) and, based on these addresses, send the message to the satellite e-mail server 612 before transmission. Likewise, the corporate e-mail server 628 of the second organization may also be configured to recognize messages with particular recipient addresses (e.g., the satellite e-mail server 612) and, based on these addresses, send the message to the master e-mail server 624 before transmission.

Figure 14:
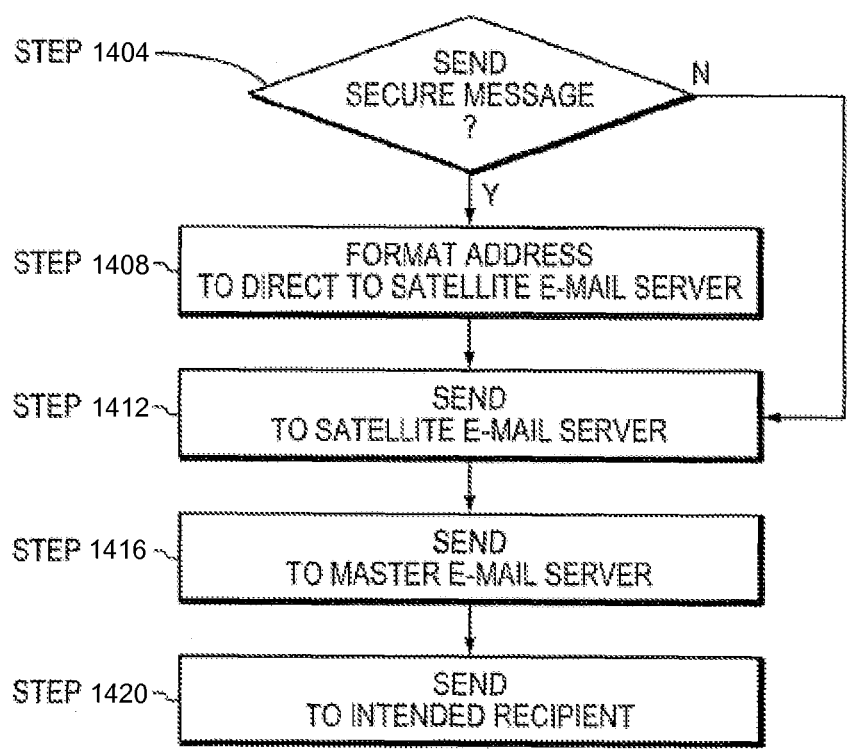
FIG. 14 is a flow diagram illustrating an embodiment of the steps performed by a message submit module of the satellite e-mail server to enable a user to securely send a message to a recipient.

Also referring to FIG. 14, the message submit module 1212 enables a user of the desktop 620 to send a new message to a recipient while the new message is sent to the master e-mail server 624 first before transmitting to the final recipient (STEP 804). The intended recipient can be anyone with an e-mail address. Thus, the intended recipient does not have to be part of the first organization's network 604 or the second organization's network 608 (i.e., no access to a secure message routing module 528, 560). If a user is operating the desktop 620 and wants to transmit a secure e-mail message to another recipient but also wants the master e-mail server 624 to process the message, the desktop 620 (i.e., the user) has to format the e-mail message so that the corporate e-mail server 616 transmits the message to the satellite server 612 rather than directly to the recipient (STEP 1408). Once the user (or desktop computer 620) inserts the special address format on an e-mail, the desktop computer 620 then transmits the message to the corporate e-mail server 616. The corporate e-mail server 616 reviews the address and determines that the message has a special address format. This special address format directs the corporate e-mail server 616 to transmit the message to the satellite e-mail server 612 for additional processing rather than transmitting it directly over the network 612 to the proper recipient (STEP 1412). The satellite e-mail server 612 then transmits the message to the master e-mail server 624 (STEP 1416). Once the master e-mail server 624 receives the message over the client-server communication channel 552, the master e-mail server 624 processes the message (e.g., provides security to the message by encrypting the message), and then directs the message to the intended recipient (STEP 1420).

The relay module 1204, secure reply module 1208, and message submit module 1212 may be software programs executing on the secure message routing module 528. Alternatively, the modules 1204, 1208, 1212 may be settings or features of the secure message routing module 528, thereby enabling a user or administrator of the satellite e-mail server 612 to configure the operation of the client 504. Additionally, any combination of the relay module 1204, the secure reply module 1208, and the message submit module 1212 can be activated or set, enabling some or all of these features for a particular satellite e-mail server 612, for a particular user, or for a particular time period.

The secure message routing system 500 can be used in many fields, operations, organizations, and preferences. For instance, health care organizations process and manage many documents during their care of patients. These documents can include confidential information relating to their patient(s). Because of such information, the documents have to be properly secured when the health care organizations process the documents electronically. Moreover, health care organizations typically use e-mail as a way to communicate with patients or other medical professionals or organizations, such as hospitals, doctors, and/or insurance providers.

Further, as a health care organization expands, the demands placed on the organization increase. The increase in demands converts to the treatment of more patients and, consequently, the health care organization has to process additional documents. Moreover, legislation can place additional restrictions on the way health care organizations communicate. For example, the Health Insurance Portability and Accountability Act (HIPAA) states that the health care organizations have to put sufficient safeguards in place when communicating. If a health care organization communicates with a patient or organization over the network 512 without appropriate protections, the organization is not complying with the Act. Furthermore, noncompliance may result in financial loss, reduced patient trust, loss of integrity, and harm to an organization's reputation. Therefore, the secure message routing system 500 can provide the requisite security needed by a health care organization to communicate over the network 512. Moreover, the secure message routing system 500 provides this security without the need to train the medical professionals and without relying on the medical professionals to enable this type of security. Instead, the medical professionals follow their usual practices when sending or receiving messages, while obtaining the security benefits provided by the secure message routing system 500.

The secure message routing system 500 can also benefit other fields. For example, the legal community views the security of its communications as a high concern. Typically, law firms transmit to and receive from its clients confidential information associated with a particular case. Maintaining the security of these transmissions may be imperative to retaining the client's business, as a security breach may ruin the client's chances of success at trial. Moreover, communications between a government agency and a development contractor or between a financial institution and a large institutional investor also often benefit, and sometimes require, security when communicating over a network 512. Thus, the secure message routing system 500 can provide the security benefits to organizations without any training needed for an organization's employees. Moreover, the risk of a user failing to perform a particular action, such as the toggling of a software switch (e.g., check box), is minimized, as the security features are implemented automatically.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method comprising:
    receiving, by a content handling engine, an instruction set, wherein the instruction set identifies: i) one or more destinations, ii) a file format for each of the one or more destinations, and iii) a security status for each of the one or more destinations designating whether or not the article of content is to be transmitted securely to the corresponding destination;
    storing, in a database, the instruction set;
    determining, by the content handling engine, a code that uniquely references the instruction set;
    providing, by the content handling engine, an embeddable form of the code, wherein the embedded code is configured to be embedded into one or more articles of content;

receiving, by the content handling engine, an article of content, wherein the code is embedded into the article of content;

identifying, by the processor, the code embedded into the article of content;

after identifying the code embedded into the article of content, identifying, by the content handling engine, the instruction set from the code;

executing, by the content handling engine, the instruction set on the article of content to transform the article of content into the identified format for each of the one or more destinations and with the identified security for each of the one or more destinations, wherein the executing further comprises:

placing the article of content into a first file, encrypting the first file using a private key of a sender to create a first encrypted article of content, and placing the first encrypted article of content into a second file, and encrypting the second file using one or more public keys associated with the one or more destinations; and distributing electronically to each of the one or more destinations a corresponding transformed article of content.

2. The method of claim 1, wherein the identifying, executing and distributing occur automatically after digitalization of the article of content.

3. The method of claim 1, wherein identifying the instruction set from the code comprises:

identifying a native code.

4. The method of claim 1, wherein identifying the instruction set from the code comprises:

identifying a foreign code; and translating the foreign code to a native code.

5. The method of claim 1, wherein identifying the instruction set from the code comprises:

parsing meta-data of the article of content to identify the code.

6. The method of claim 1, wherein identifying instruction set from the code comprises:

locating the code in a field of the article of content.

7. The method of claim 1, wherein identifying the instruction set from the code comprises:

identifying the code using at least one of optical-character recognition, voice recognition, bar code recognition, and voice-to-text recognition.

8. The method of claim 1, wherein identifying the instruction set from the code comprises:

accessing a memory storing sets of instructions; and matching the code with a set of instructions.

9. The method of claim 1, wherein the article of content is at least one of: a PDF document, word processing document, electronic mail message, analog audio file, digital audio file, analog video file, digital video file, paper, and an x-ray.

10. The method of claim 1, wherein the one or more destinations comprises at least one of: an e-mail address, a telefax number, a printer address, a local file system folder, a network file system folder, and a document repository.

11. The method of claim 1, further comprising:

comparing a format of the article of content to the identified format for each of the one or more destinations prior to the executing step.

12. The method of claim 1, wherein the format for each of the one or more destinations comprises one or more members selected from the group consisting of a PDF file, word processing file, electronic mail message, analog audio file, digital audio file, analog video file, digital video file, paper, image file, picture file, text file, and an x-ray.

13. A system comprising:

a database configured to store instruction sets;

a content handling engine, wherein the content handling engine comprises a processor configured to handling and routing of an article of content, wherein the processor is configured to execute instructions to:

receive an instruction set, wherein the instruction set identifies: i) one or more destinations, ii) a file format for each of the one or more destinations, and iii) a security status for each of the one or more destinations designating whether or not the article of content is to be transmitted securely to the corresponding destination;

store, in the database, the instruction set;

determine a code that uniquely references the instruction set;

provide an embeddable form of the code, wherein the embedded code is configured to be embedded into one or more articles of content;

receive an article of content, wherein the code is embedded into the article of content;

identifying, by the processor, the code embedded into the article of content;

after identifying the code embedded into the article of content, identify the set of instructions from the code;

execute the instruction set on the article of content to transform the article of content into the identified format and according to the identified security for each of the one or more destinations, wherein the executing further comprises:

placing the article of content into a first file, encrypting the first file using a private key of a sender to create a first encrypted article of content, placing the first encrypted article of content into a second file, and encrypting the second file using one or more public keys associated with the one or more destinations; and distribute electronically to each of the one or more destinations a corresponding transformed article of content.

14. The system of claim 13, wherein the article of content is at least one member selected from the group consisting of: a PDF document, word processing document, electronic mail message, analog audio file, digital audio file, analog video file, digital video file, paper, and an x-ray.

15. The system of claim 13, wherein the one or more destinations comprises at least one member selected from the group consisting of: an e-mail address, a telefax number, a printer address, a local file system folder, a network file system folder, and a document repository.

16. The system of claim 13, further wherein the processor is configured to execute instructions to:

compare a format of the article of content to the identified format for each of the one or more destinations prior to the executing step.

17. The system of claim 13, wherein the format for each of the one or more destinations comprises one or more members selected from the group consisting of a PDF file, word processing file, electronic mail message, analog audio file, digital audio file, analog video file, digital video file, paper, image file, picture file, text file, and an x-ray.

* * * * *